United States Patent
Amano et al.

(10) Patent No.: US 8,458,697 B2
(45) Date of Patent: Jun. 4, 2013

(54) METHOD AND DEVICE FOR ELIMINATING PATCH DUPLICATION

(75) Inventors: Takashi Amano, Kawasaki (JP); Yasunori Kaneda, Yokohama (JP); Toru Tanaka, Sagamihara (JP); Noriko Nakajima, Machida (JP)

(73) Assignee: Hitachi, Ltd., Tokyo (JP)

( * ) Notice: Subject to any disclaimer, the term of this patent is extended or adjusted under 35 U.S.C. 154(b) by 337 days.

(21) Appl. No.: 12/936,041

(22) PCT Filed: Sep. 14, 2010

(86) PCT No.: PCT/JP2010/005594
§ 371 (c)(1),
(2), (4) Date: Oct. 1, 2010

(87) PCT Pub. No.: WO2012/035575
PCT Pub. Date: Mar. 22, 2012

(65) Prior Publication Data
US 2012/0066680 A1   Mar. 15, 2012

(51) Int. Cl.
*G06F 9/455*   (2006.01)
*G06F 9/46*   (2006.01)
(52) U.S. Cl.
USPC .............................................. 718/1; 718/104
(58) Field of Classification Search
None
See application file for complete search history.

(56) References Cited

U.S. PATENT DOCUMENTS

| 6,857,001 | B2 | 2/2005 | Hitz et al. |
| 7,343,599 | B2 * | 3/2008 | Panjwani ...................... 717/168 |
| 2002/0188940 | A1 | 12/2002 | Breckner et al. |
| 2007/0208918 | A1 | 9/2007 | Harbin et al. |
| 2009/0288082 | A1 | 11/2009 | Nazeer et al. |
| 2009/0320014 | A1 | 12/2009 | Sudhakar |

FOREIGN PATENT DOCUMENTS

EP   2182437 A1 *   5/2010

* cited by examiner

*Primary Examiner* — Camquy Truong
(74) *Attorney, Agent, or Firm* — Volpe and Koenig, P.C.

(57) ABSTRACT

A first computer is provided that executes a plurality of virtual machines (VMs), a storage device, and a second computer is provided that applies patches to OSs (operating systems) operating upon the VMs to the VMs. The storage device holds storage regions (golden images (GIs)) that store data of the OSs operating upon the VMs at certain time instants, a storage region that stores patches applied to the OSs of the VMs after those certain time instants, and snapshots of the GIs. Patches applied to the OSs of the VMs accessed in the snapshots are stored in the storage pool. The second computer selects, as a GI to be a source of acquisition of snapshots, a GI to which are applied patches of a combination that can be created from patches applied to the OS of some VM, and deletes patches that are patches applied to the selected GI, and that moreover, among the patches applied to that VM, are stored in the storage pool.

14 Claims, 37 Drawing Sheets

Fig. 5

| LU ID | VM ID | Guest OS | VM IP address | GI LU ID | LU size | Storage device ID |
|---|---|---|---|---|---|---|
| ss01 | vm01 | Win Svr 2008 R2 | 192.168.1.200 | gi01 | 20GB | stg01 |
| ss02 | vm02 | Win Svr 2008 R2 | 192.168.1.201 | gi01 | 20GB | stg01 |
| ss03 | vm03 | Win Svr 2008 R2 | 192.168.1.202 | gi01 | 20GB | stg01 |
| ss04 | vm04 | Win Svr 2008 R2 | 192.168.1.203 | gi01 | 20GB | stg01 |
| ss05 | vm05 | Win Svr 2008 R2 | 192.168.1.204 | gi03 | 20GB | stg01 |
| ss06 | vm06 | Win Svr 2008 R2 | 192.168.1.205 | gi03 | 20GB | stg01 |
| ss07 | vm07 | Win Svr 2008 R2 | 192.168.1.206 | gi04 | 20GB | stg01 |
| ss08 | vm08 | Win Svr 2008 R2 | 192.168.1.207 | gi04 | 20GB | stg01 |
| ss09 | vm09 | Win Svr 2008 R2 | 192.168.1.208 | gi05 | 20GB | stg01 |
| ss10 | vm10 | Win Svr 2008 R2 | 192.168.1.209 | gi05 | 20GB | stg01 |
| ss11 | vm11 | Win Svr 2008 R2 | 192.168.1.210 | gi06 | 20GB | stg01 |
| ss12 | vm12 | Win Svr 2008 R2 | 192.168.1.211 | gi06 | 20GB | stg01 |
| gi01 | vmg01 | Win Svr 2008 R2 | 192.168.1.212 | gi01 | 20GB | stg01 |
| gi03 | vmg03 | Win Svr 2008 R2 | 192.168.1.214 | gi03 | 20GB | stg01 |
| gi04 | vmg04 | Win Svr 2008 R2 | 192.168.1.215 | gi04 | 20GB | stg01 |
| gi05 | vmg05 | Win Svr 2008 R2 | 192.168.1.215 | gi05 | 20GB | stg01 |
| gi06 | vmg06 | Win Svr 2008 R2 | 192.168.1.216 | gi06 | 20GB | stg01 |

Fig. 6

| VM ID | A | B | C | D |
|---|---|---|---|---|
| vm01 | Diff | - | - | - |
| vm02 | Diff | - | - | - |
| vm03 | Diff | Diff | - | - |
| vm04 | Diff | Diff | - | - |
| vm05 | - | - | GI | - |
| vm06 | - | - | GI | - |
| vm07 | - | - | GI | - |
| vm08 | - | - | GI | - |
| vm09 | - | - | - | Diff |
| vm10 | - | - | - | Diff |
| vm11 | - | - | - | GI |
| vm12 | - | - | - | GI |

Fig. 7

| Capacity threshold value | Proportional threshold value |
|---|---|
| 20MB | 10% |

Fig. 8

| Patch ID | Size |
|---|---|
| A | 30MB |
| B | 50MB |
| C | 500MB |
| D | 1GB |

Fig. 9

| Patch combination | VM ID | GI LU ID | Confirmation flag |
|---|---|---|---|
| - | - | gi01, gi05 | 0 |
| A | vm01, vm02 | - | 0 |
| AB | vm03, vm04 | - | 0 |
| C | vm05, vm06, vm07, vm08 | gi03, gi04 | 0 |
| D | vm09, vm10, vm11, vm12 | gi06 | 0 |

Fig. 10A

| VM ID | GI LU ID | Added patch |
|---|---|---|
| vm01 | gi01 | - |
| vm02 | gi01 | - |
| vm03 | gi01 | B |
| vm04 | gi01 | B |
| vm05 | gi04 | - |
| vm06 | gi04 | - |
| vm07 | gi04 | - |
| vm08 | gi06 | - |
| vm09 | gi06 | - |
| vm10 | gi06 | - |
| vm11 | gi06 | - |
| vm12 | gi06 | - |

| VM ID | GI LU ID | Copy source | Added patch |
|---|---|---|---|
| vmg01 | gi01 | - | A |

207b, 810, 811, 812, 813

| VM ID | Registry ID | Destination for storage |
|---|---|---|
| vm01 | reg01 | ¥¥192.168.200.30¥vm01 |
| vm02 | reg02 | ¥¥192.168.200.30¥vm02 |
| vm03 | reg03 | ¥¥192.168.200.30¥vm03 |
| vm04 | reg04 | ¥¥192.168.200.30¥vm04 |
| vm05 | reg05 | ¥¥192.168.200.30¥vm05 |
| vm06 | reg06 | ¥¥192.168.200.30¥vm06 |
| vm07 | reg07 | ¥¥192.168.200.30¥vm07 |
| vm08 | reg08 | ¥¥192.168.200.30¥vm08 |
| vm09 | reg09 | ¥¥192.168.200.30¥vm09 |
| vm10 | reg10 | ¥¥192.168.200.30¥vm10 |
| vm11 | reg11 | ¥¥192.168.200.30¥vm11 |
| vm12 | reg12 | ¥¥192.168.200.30¥vm12 |

Fig. 17

| LU ID of snapshot | GI LU ID | LU size |
|---|---|---|
| ss01 | gi01 | 20GB |
| ss02 | gi01 | 20GB |
| ss03 | gi01 | 20GB |
| ss04 | gi01 | 20GB |
| ss05 | gi03 | 20GB |
| ss06 | gi03 | 20GB |
| ss07 | gi04 | 20GB |
| ss08 | gi04 | 20GB |
| ss09 | gi05 | 20GB |
| ss10 | gi05 | 20GB |
| ss11 | gi06 | 20GB |
| ss12 | gi06 | 20GB |

Fig. 18

| LU ID of snapshot | Address of LU of snapshot | LU ID of storage region | Address of storage region |
|---|---|---|---|
| ss01 | 0001 | gi01 | 0001 |
| ss01 | 0002 | gi01 | 0002 |
| ss01 | 0003 | sp01 | 0001 |
| ss01 | 0004 | gi01 | 0004 |
| ss01 | 0005 | sp01 | 0002 |

Fig. 35

| Storage device ID | Empty capacity | I/O load | CPU usage ratio | SNW I/F usage ratio |
|---|---|---|---|---|
| stg01 | 10TB | 8000IOPS | 50% | 60% |
| stg02 | 11TB | 7000IOPS | 45% | 50% |
| stg03 | 12TB | 6000IOPS | 40% | 40% |
| stg04 | 13TB | 5000IOPS | 35% | 30% |
| stg05 | 14TB | 4000IOPS | 30% | 20% |
| stg06 | 15TB | 3000IOPS | 25% | 10% |

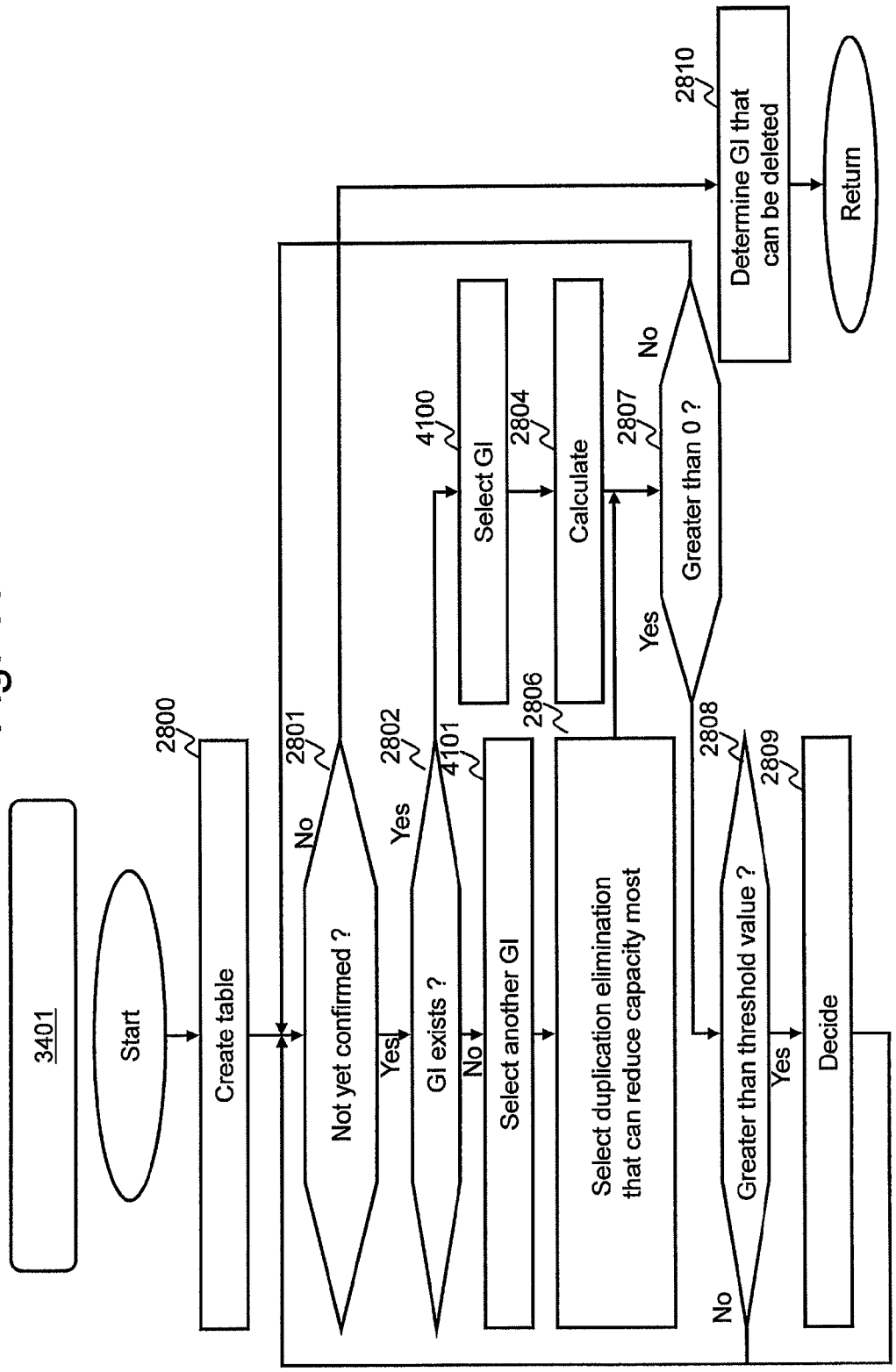

METHOD AND DEVICE FOR ELIMINATING PATCH DUPLICATION

TECHNICAL FIELD

The present invention relates to reduction of the storage capacity consumed by a computer system upon which virtual machines are operating.

BACKGROUND ART

Generally, a computer system executes processing of various types using a plurality of computers. When building a computer system, in order to reduce the volume occupied by the device, sometimes virtual computers (hereinafter termed "virtual machines" (VMs)) are used rather than physical computers. A VM performs processing of various kinds by starting an operating system (hereinafter termed an "OS") that is installed upon a virtual storage device (hereinafter termed a "virtual disk"). Such a virtual disk is implemented as a file in a file system. It is possible to create a plurality of virtual disks by creating a plurality of copies of a file system in which the file of a virtual disk for which the initial setup has been completed is stored. By doing this, a plurality of VMs can be created in a simple manner, already initially set up.

A technique is known for acquiring a snapshot of a file system (hereinafter termed an "SS") that can be logically written (refer to PTL 1). According to this technique, when the file of a snapshot is being updated, differential data between the file before updating and the file after updating is stored in a different storage region from the snapshot. The destination for storage of this differential data is changed to a different storage region.

CITATION LIST

Patent Literature

[PTL 1] U.S. Pat. No. 6,857,001.

SUMMARY OF INVENTION

Technical Problem

In provisioning of VMs using snapshots, a patch that is applied to the guest OSs of a large number of VMs is stored in the storage device as differential data for the snapshot of each VM. Due to this, a great amount of storage capacity in the storage device is consumed when a plurality of patches that are large in size are applied to a large number of VMs, and this is very undesirable.

The object of the present invention is to eliminate such duplication when the same patch is allocated to several VMs, and thereby to reduce the amount of storage capacity that is consumed.

Solution to Problem

In order to solve the problem described above, there is provided a computer system that includes a first computer that executes a plurality of VMs, a storage device that includes a storage medium, and a second computer that applies patches for the OSs that operate upon the VMs to the VMs. The first computer, the storage system, and the second computer are mutually coupled together.

The storage device contains golden images (hereinafter termed "GIs") that store data of OSs operating upon the VMs at certain time points, a storage pool that stores patches applied to the OSs of the VMs at certain subsequent time points, and snapshot LUs ("LU" is an abbreviation of "Logical Unit"). The first computer acquires the data of the OSs of the VMs from the snapshot LUs. This data is built up from the snapshots of the GIs and from the patches stored in the storage pool.

The second computer selects, as a GI that is to be a source for snapshot acquisition, a GI to which a patch is applied that is a combination that can be created from some of the patches applied to the OSs of the VMs. And the second computer deletes those patches stored in the storage pool, that are patches applied to the GI that has been selected, and that moreover are among the patches that are applied to this VM. In this way, duplication of the patches may be eliminated.

Advantageous Effects of Invention

According to the present invention, it is possible to eliminate duplication in which the same patch is allocated to several VMs, and thereby it is possible to reduce the amount of storage capacity that is consumed.

BRIEF DESCRIPTION OF DRAWINGS

FIG. 5 shows the structure of an LU VM management table 202.

FIG. 6 shows the structure of a VM patch management table 203.

FIG. 7 shows the structure of a threshold value management table 204.

FIG. 8 shows the structure of a patch management table 205.

FIG. 9 shows the structure of a patch combination management table 206.

FIG. 10A shows the structure of a first processing management table 207a. FIG. 10B shows the structure of a second processing management table 207b.

FIG. 17 shows the structure of an LU management table 1401.

FIG. 18 shows the structure of an address management table 1402.

FIG. 35 shows the structure of a storage device management table 3402.

FIG. 41 shows a flow chart for processing for determining a subject for duplication elimination, according to the second embodiment.

DESCRIPTION OF EMBODIMENTS

Several embodiments of the present invention will now be explained using the drawings.

It should be understood that in the following embodiments, in some cases, duplicated explanation of elements to which the same reference symbol is appended is omitted, since such elements denoted by the same reference symbol have the same principles and construction, perform the same operation, and/or have the same function.

Moreover while in the following explanation, in some cases, various types of information are described as being an "xxxx table" this information could also be expressed as a data structure other than a table. In order to make this absence of dependence upon the data structure clear, in some cases "xxxx table" may be worded as "xxxx information".

Moreover while in the following explanation, in some cases, the processing is explained while employing a "program" as the grammatical subject, since this program is executed by a processor (for example a CPU (Central Processing Unit)), the grammatical subject that performs the processing may also be the processor, which performs the specified processing while using appropriate resources (for example, memory) and/or communication interface devices (for example, communication ports). Processing that is explained by employing a program as the grammatical subject may also be processing that is performed by a management system. Furthermore, the processor may also include one or more hardware circuits that perform a part or all of the processing performed by the processor. The program may also be installed upon several computers from a program source. For example, this program source may be a program distribution server or a storage medium.

It should be understood that the management system may consist of one or more computers. In concrete terms, for example, if the management computer displays information, or if the management computer transmits information for display to a remote computer, then the management computer is a management system. Furthermore, for example, if the same functions as those of the management computer are implemented with a plurality of computers (in the case in which display is performed by a computer for display, this may also include the computer for display), then this plurality of computers constitute a management system. In the following, it will be supposed that the management system is a management computer.

EXAMPLE 1

Figure 1:
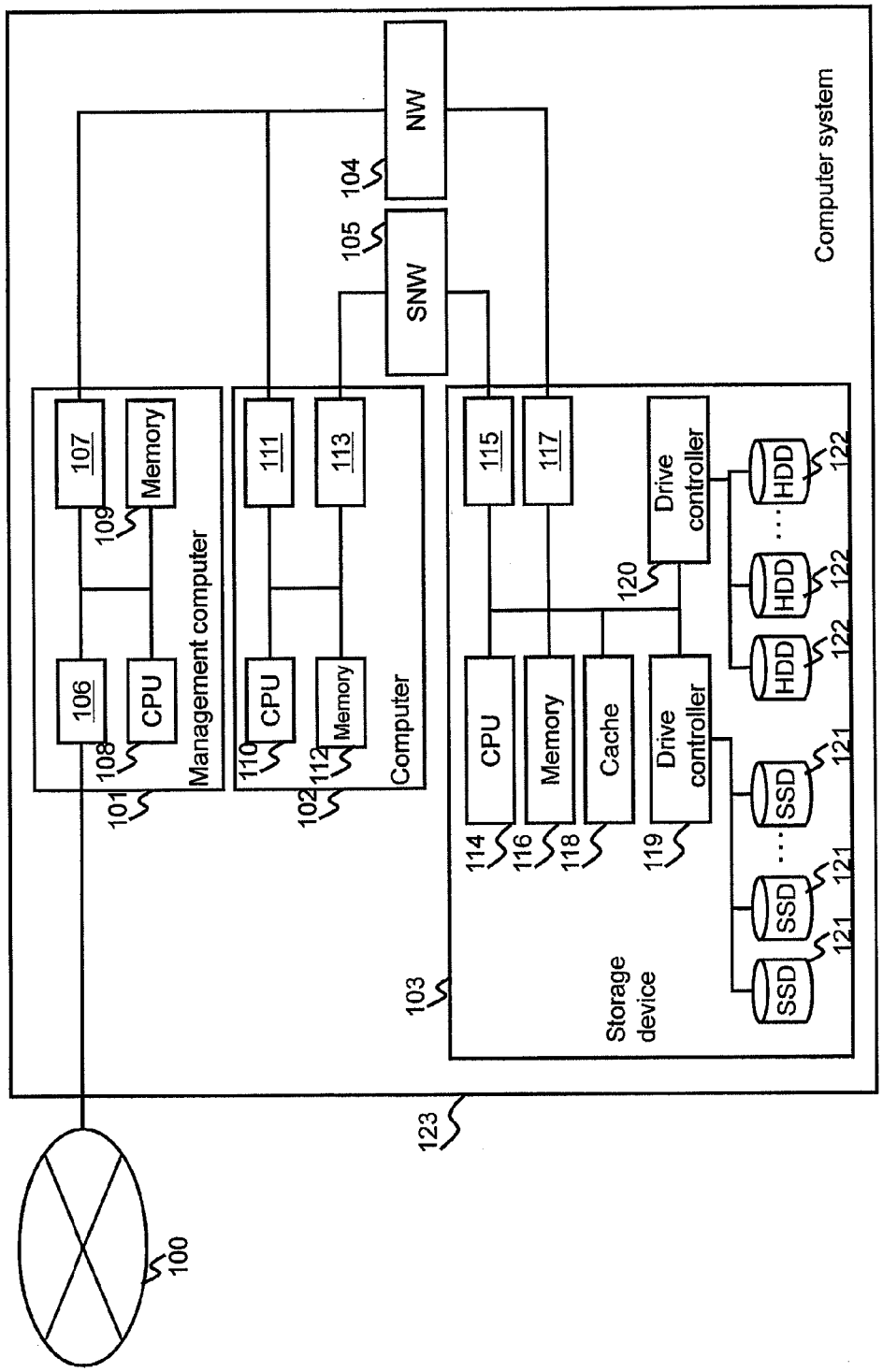
FIG. 1 shows the structure of a computer system according to a first embodiment of the present invention.

FIG. 1 shows the structure of a computer system according to the first embodiment of the present invention.

This computer system 123 comprises a management computer 101, a computer 102, a storage device 103, a network connection device 104 (hereinafter termed a "NW connection device"), and a storage network connection device 105 (hereinafter termed a "SNW connection device").

The management computer 101, the computer 102, and the storage device 103 are coupled together with Ethernet cabling via the NW connection device 104 ("Ethernet" is a registered trademark). This network that is established via the NW connection device 104 is a network (hereinafter termed the "management network") for management and control of this computer system 123. And the network that includes the SNW connection device 105 is a network (hereinafter termed the "storage network") via which data generated by the computer 102 is transferred for storage in the storage device 103, and via which data read from the storage device 103 is transferred to the computer 102. The management computer 101 is coupled to the internet 100 by an Ethernet cable. While the computer 102 and the SNW connection device 105, and the SNW connection device 105 and the storage device 103, are coupled together by fiber channel cables and communicate according to a fiber channel protocol, they could also be coupled together by Ethernet cables and could communicate according to the iSCSI protocol. In other words, the communication networks by which the storage device 103, the management computer 101, and the computer 102 are coupled together, and the communication protocols that are used for communication between the storage device 103, the management computer 101, and the computer 102, are not particularly limited. It would also be acceptable to employ some communication network other than the internet 100 (for example a LAN (Local Area Network) or a SAN (Storage Area Network)).

The management computer 101 is a computer that manages the storage device 103 and the computer 102. This management computer 101 comprises a communication interface device, a storage resource, and a processor that is coupled to these devices. In concrete terms, for example, the management computer 101 may comprise a network interface 106 (hereinafter termed a "NW I/F"), another NW I/F 107, a CPU 108, and a memory 109.

The NW I/F 106 is coupled to the interne 100, and is for transmission and reception of data between the interne 100 and the management computer 101.

And the NW I/F 107 is coupled to the NW connection device 104, and is for transmission and reception of data between the NW connection device 104 and the management computer 101.

The CPU 108 is a device for performing processing of programs stored in the memory 109.

The memory 109 is a device for storage of programs and management tables.

The computer 102 is a computer that executes one or a plurality of virtual machines (hereinafter termed "VMs"). In other words, in the computer system according to this embodiment, a plurality of VMs are executed by one or more computers 102. The VMs issue I/O commands that designate logic units (hereinafter termed "LUs") provided from the storage device 103.

The computer 102 includes a communication interface device, a storage resource, and a processor that is coupled to these devices. In concrete terms, for example, the computer 102 may comprise a network interface 111, an SNW I/F 113, a CPU 110, and a memory 112.

The NW I/F 111 is coupled to the NW connection device 104, and is for transmitting and receiving data between the NW connection device 104 and the computer 102.

The CPU 110 is a device for performing processing of programs stored in the memory 112.

The memory 112 is a device for storage of programs and management tables.

The storage device 103 includes a plurality of physical storage devices and a controller that couples them together. This controller includes a communication interface device, a storage resource, and a processor that couples them together. In concrete terms, as an example, the controller may include a NW I/F 117, an SNF I/F 115, a CPU 114, a memory 116, a cache 118, a drive controller 119, and a drive controller 120. One or more LUs (logical volumes) are defined on the basis of this plurality of physical storage devices. The plurality of physical storage devices are physical storage devices of one or a plurality of types. In concrete terms, as an example, the plurality of physical storage devices may be SSDs (Solid State Drives) 121 and HDDs (Hard Disk Drives) 122.

The NW I/F 117 is coupled to the NW connection device 104, and is for transmitting and receiving data between the NW connection device 104 and the storage device 103.

The CPU 114 is a device for performing processing of programs stored in the memory 116.

The memory 116 is a device for storage of programs and management tables.

The cache 118 is a device (for example, a memory) that temporarily stores data, in order for data written to the SSDs 121 and the HDDs 122, and data read from the SSDs 121 and the HDDs 122, to be transmitted and received via the SNF I/F 115 with good efficiency.

The drive controller 119 is a device that controls communication of data between the cache 118 and the SSDs 121.

And the drive controller 120 is a device that controls communication of data between the cache 118 and the HDDs 122.

Writing of data to a snapshot 1708 or to a golden image 1710 (hereinafter termed a "GI"), reading of data from a snapshot 1708 or from a GI 1710, and communication related to mounting or unmounting of an LU by the computer 102 are performed via the storage network (the snapshot 1708 and the GI 1710 will be explained hereinafter).

Other communication is performed via the management network. It would also be acceptable for requests to a storage device management program 1400 to be made via the storage network.

In this embodiment, snapshots of LUs are used rather than snapshots of file systems. Both an LU and a snapshot of an LU are made up from a plurality of logical storage regions. In the following the storage regions that make up an LU will be termed "blocks", and the data that is stored in a block (all the units that together make up the data) will be termed "block data".

When some block of a snapshot is to be a destination for writing of data (in other words, when the block data in some block is to be updated), this data is not written to the block that is the current write destination. Rather, block data in which this data is included (hereinafter termed "differential block data") is written to a block within a storage pool (i.e. to a block within some other storage region than the LU and the snapshot thereof). And the position of this differential block data is managed as a block within the storage pool, and not as a block of the write destination within the snapshot. In this case, the data present in the snapshot is the union of the data within the LU corresponding to this snapshot and the data in the storage region within the storage pool. Here, the "storage pool" is a logical storage device that is made up of a plurality of logical storage regions, and is the backup destination for block data, including the data to be written to the snapshot of the LU. It would be acceptable to provide one storage pool for each single snapshot, or one storage pool in common for a plurality of snapshots. The following procedures (a) and (b) are performed each time data is to be written to a snapshot:

(a) block data in which this data is included is backed up to the storage pool corresponding to this snapshot; and (b) the position at which block data is present within the block that is the write destination in this snapshot is managed, not as a block within the LU corresponding to the snapshot, but rather as a block of the backup destination in the storage pool.

With the objective of reducing the storage capacity occupied by the VMs, it would be possible for a snapshot to be acquired of an LU in which is stored information related to a VM that is to be a master (for example, the guest OS that is executed by the VM that is to be a master), and for this to be used for provisioning a plurality of VMs.

Figure 2:
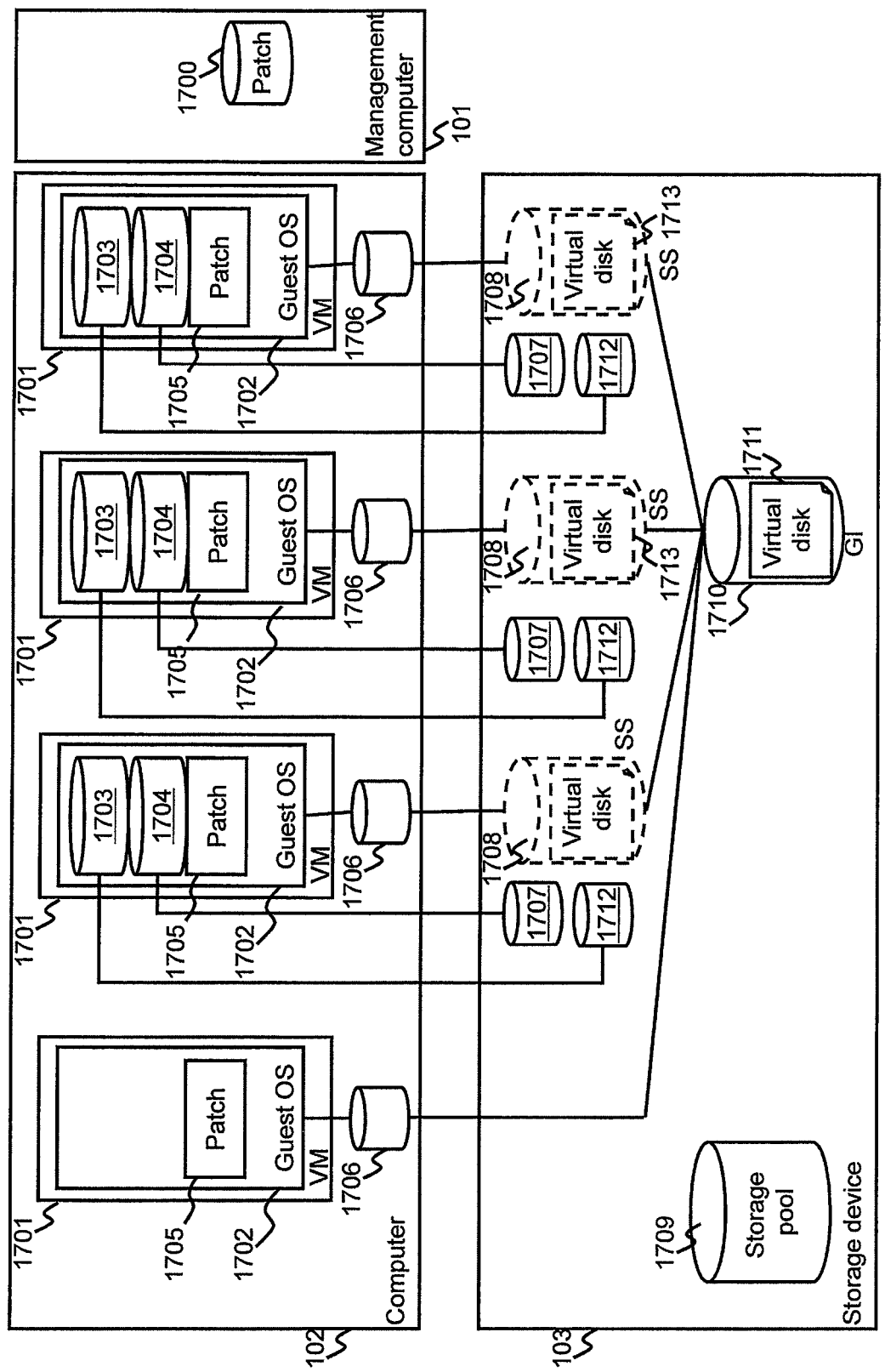
FIG. 2 shows a logical structure when a snapshot of an LU and also another LU are utilized as destinations for storage of user data and application data.

FIG. 2 shows a logical structure when snapshots of LUs and also a separate LU are utilized as destinations for storage of user data and application data.

The LU of the storage device 103 is used as a place for storage of user data and application data. Due to this, the data that is written into snapshots 1708 is only the data correlated with the guest OSs 1702.

A patch update management program 201 of the management computer 101 periodically acquires, via the internet 100, patches 1700 that are supplied from the source of supply of the guest OSs 1702, and stores them in the management computer 101. At this time, the patch update management program 201 also acquires the sizes of the patches from the source of supply of the guest OSs 1702. Patches 1705 to be applied to the guest OSs 1702 are supplied from the patch update management program 201. It should be understood that while, in this embodiment, "patch" means a patch applied to a guest OS 1702, it would also be acceptable for it to be a patch of some other type (for example, a patch applied to an application program).

The storage device 103 includes a storage pool 1709, a GI 1710, a virtual disk file 1711, the snapshots 1708, LUs 1707, and other LUs 1712. Pluralities of the GI 1710 and the snapshots 1708 may be present. It would also be acceptable for at least a single LU of the plurality of LUs possessed by the storage device 103 to be a virtual LU corresponding to an LU possessed by an external storage device (not shown in the drawings) coupled to the storage device 103.

The storage pool 1709 is a logical storage device that consists of one or more LUs. Block data including the data written in the snapshots 1708 is backed up to the storage pool 1709. This block data is differential data for the snapshots 1708.

The GI 1710 is the LU that is the acquirement source of the snapshots. Although this is not shown in the figure, information related to the VMs 1701 corresponding to this single GI 1710 is present within this GI 1710. This information is data at some time points for the guest OSs 1702 of these VMs 1701. Thereafter, when data is to be written in a snapshot 1708, the storage device 103 stores block data in which this data is included in the storage pool 1709 as differential data.

The virtual disk file 1711 is a file that implements virtual hard disks used on the VMs 1701. While, in this embodiment, a file that implements virtual hard disks is used, it would also be acceptable for an LU to be used as a virtual hard disk.

The snapshots 1708 are LUs corresponding to logical copies of GIs. From a single snapshot 1708, the guest OS 1702 corresponding to this snapshot 1708 is supplied to a VM 1701. The data supplied from the snapshots 1708 may consist of only data in the GI 1711, or of data within the GI 1711 and also patch block data within the storage pool 1709. One item or more of the differential block data within the storage pool 1709 may, for example, be one item or more of block data in which is included a patch that is not applied to the GI 1711.

The LUs 1707 store application programs (application data) installed upon the VMs 1701.

The LUs 1712 store data (user data) according to I/O commands issued by application programs via the guest OSs.

The computer 102 includes LUs 1706, LUs 1703 of user data, and LUs 1705 of application data. VMs 1701 are executed by the computer 102. The guest OSs 1702 are executed by the VMs 1701. Sometimes it is the case that a patch 1705 is applied to a guest OS 1702.

The LUs 1706 correspond to snapshots 1708 of states recognized by the OS of the computer 102. Recognition of a snapshot 1708 by the OS of the computer 102 is termed "mounting".

Each VM 1701 is an emulation of a physical computer.

The guests OS 1702 are OSs that operate upon the VMs 1701. Guest OSs 1702 are included in virtual disk files 1713 stored in the snapshots 1708.

A user data LU 1703 is an LU that mounts an LU 1712 with a guest OS 1702.

An application data LU 1705 is an LU that mounts an LU 1707 with a guest OS 1702.

A patch 1705 is a program that is applied to a guest OS 1702.

An LU 1703 of user data and an LU 1704 of application data may be mounted when their VM 1702 starts and unmounted when it stops. A patch 1705 is applied to a guest OS 1702 by the patch update management program 201 of the management computer 101. A patch 1705 that has been applied is written to a snapshot 1708. A patch 1705 that has been written is stored in the storage pool 1709 as differential data for the GI 1710. Furthermore, when a patch 1705 has been applied to a VM 1701 corresponding to the GI 1710, this patch 1705 is stored in the GI 1710.

Figure 3:
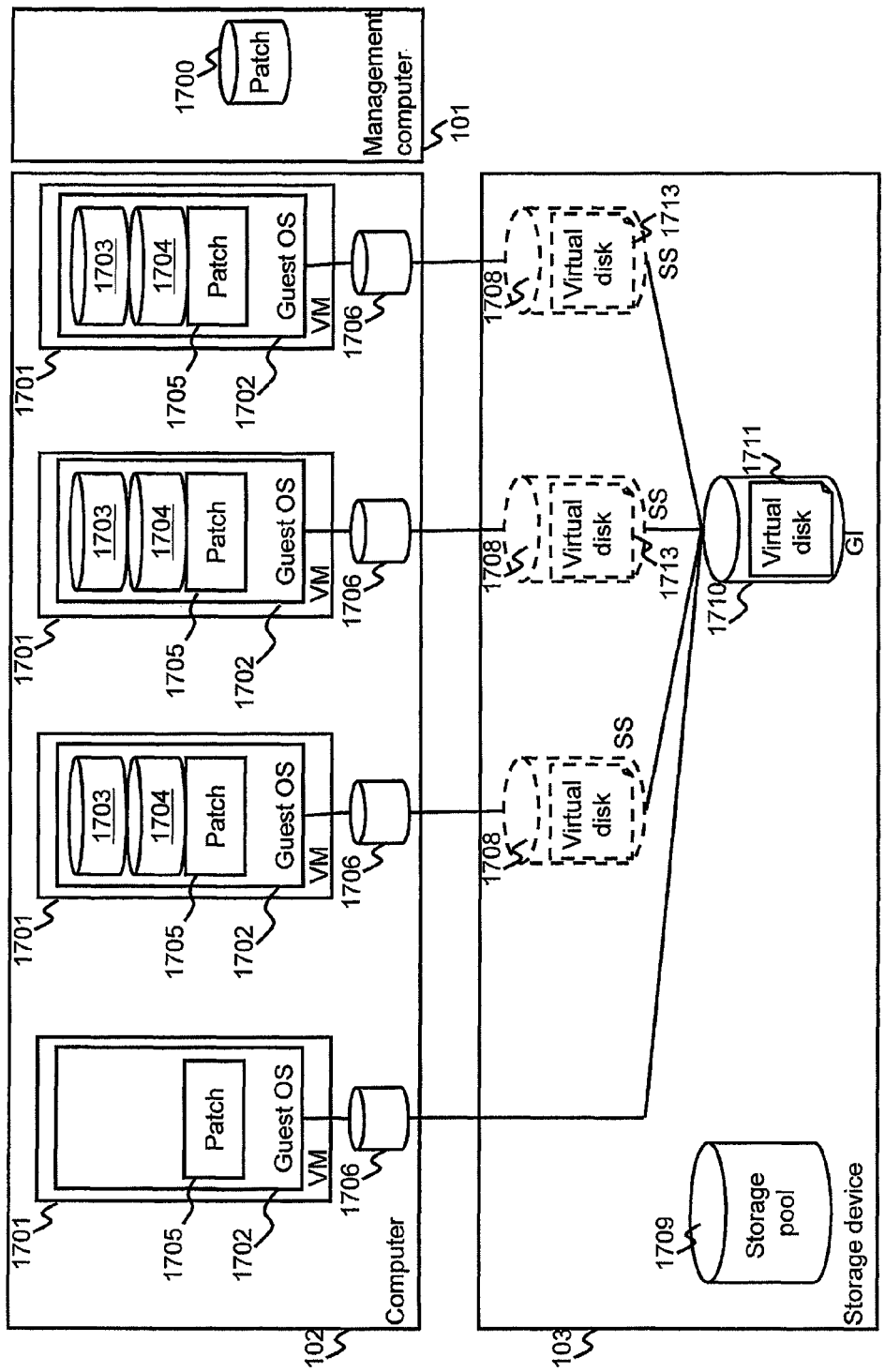
FIG. 3 shows a logical structure when a snapshot of an LU is utilized as a destination for storage of an OS, user data, and application data.

FIG. 3 shows a logical structure when snapshots of the LUs are utilized as destinations for storage of the OSs, user data, and application data.

LUs held by the guest OSs 1702 are utilized as storage locations for user data and application data. Due to this, in addition to data correlated with the guest OSs 1702, the data written into the snapshots 1708 includes data correlated with user data and with applications.

Figure 4:
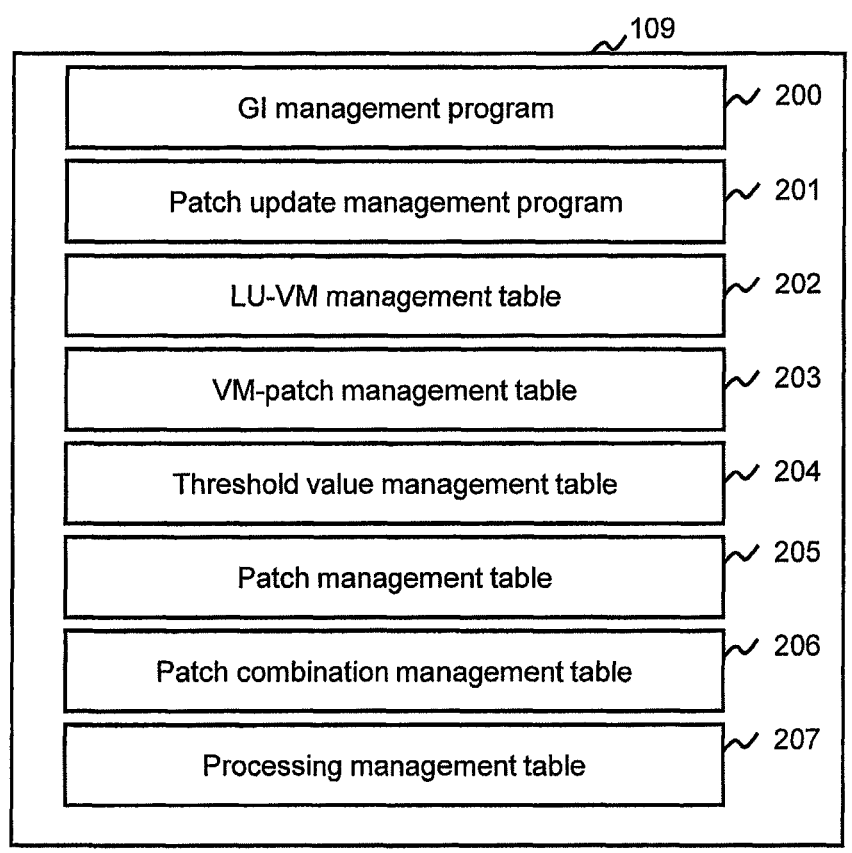
FIG. 4 shows information and programs stored in a memory 109 of a management computer 101.

FIG. 4 shows information and programs stored in the memory 109 of the management computer 101.

The memory 109 stores a GI management program 200, the patch update management program 201, an LU VM management table 202, a VM patch management table 203, a threshold value management table 204, a patch management table 205, a patch combination management table 206, and a processing management table 207.

The GI management program 200 monitors the patches 1705 applied to the guest OSs 1702 of the VMs 1701, and reduces consumption of the storage capacity of the storage device 103 by performing duplication elimination processing of these patches 1705. This GI management program 200 stores information that is needed when creating new LUs or VMs (for example, unused LU IDs, VM IDs, and IP addresses). It would also be acceptable to arrange for the GI management program 200 to acquire unused LU IDs from a storage management program 1400 (to be described hereinafter). In this case, the storage device management program 1400 would hold the unused LU IDs.

The patch update management program 201 manages patches that can be applied to the guest OSs 1702, and patches 1705 applied to the guest OSs.

The LU VM management table 202 holds information that specifies the correspondence relationship between the LUs and the VMs 1701 of the storage device 103.

The VM patch management table 203 holds information that specifies the correspondence relationship between the VMs 1701 and patches applied to the guest OSs 1702.

The threshold value management table 204 holds threshold values of one or several types that are used for deciding whether or not to execute duplication elimination processing.

The patch management table 205 holds information about patches that can be applied to the guest OSs 1702.

The patch combination management table 206 is created when duplication elimination processing is executed. This table 206 holds information that specifies the correspondence relationship between combinations of the patches 1705 (one or more of the patches 1705) that have already been applied to the guest OSs 1702, the VMs 1701, and the GI 1710. In the following, a virtual disk file that is stored in the GI will be termed a "master disk file", an OS that is included in a master disk file 1711 will be termed a "master guest OS", and a VM that uses a master disk file 1711 will be termed a "master VM".

The processing management table 207 holds information that is used in the duplication elimination processing. This processing management table 207 consists of a processing management table 207a (described hereinafter) that is used in duplication elimination processing in which the GI is not copied, and another processing management table 207b (also described hereinafter) that is used in duplication elimination processing in which the GI is copied. In the following, the table 207a will be termed the "first processing management table 207a" and the table 207b will be termed the "second processing management table 207b". It should be understood that it would also be acceptable to provide only one or the other of the tables 207a and 207b.

FIG. 5 shows the structure of the LU VM management table 202.

This LU VM management table 202 may include, for example, the following information for each VM: its LU ID 300, its VM ID 301, its guest OS 302, its VM IP address 303, its GI LU ID 304, its LU size 305, and its storage device ID 306. In the following, these various types of information will be explained by taking as an example a single VM (termed the "subject VM" in the explanation of FIG. 5).

The LU ID 300 is the ID of the LU (for example, "LUN") on which the virtual disk file used by the subject VM 1701 is stored.

The VM ID 301 is an identifier for the subject VM 1701.

The guest OS 302 is information specifying the type of the OS that is installed upon the virtual disk used by the subject VM 1701 (for example, including information that specifies the version number).

The VM IP address 303 is the IP address of the guest OS 1702 that operates upon the subject VM 1701.

If the LU that is accessed by the subject VM 1701 is a snapshot, then the GI LU ID 304 is the ID (for example, "LUN") of the GI corresponding to that snapshot, whereas, if the LU that is accessed by the subject VM 1701 is a GI, then it is the ID of that GI (for example, "LUN").

The LU size 305 is information that specifies the size (i.e. the capacity) of the LU (i.e. of the GI or of its snapshot) accessed by the subject VM 1701.

The storage device ID 306 is the ID of the storage device containing the LU accessed by the subject VM 1701 (for example, the serial number of that storage device). This storage device ID 306 is used in the second embodiment.

FIG. 6 shows the structure of the VM patch management table 203.

For each VM, this VM patch management table 203 holds, for example, the following information: the VM ID 400, and patches A401 through D404. In the following, these various types of information will be explained by taking a single VM as the subject (in the explanation of FIG. 6, this will be termed the "subject VM").

The VM ID 400 is the ID of the VM 1701.

The patches A401 through D404 are the IDs of the patches that can be applied to the guest OS 1702 that is executed by the subject VM. In the following, among these patches A (401) through D(404), the patch A (401) will be selected as the example to be explained. This patch A is applied to the guest OS 1702 that is executed by the subject VM 1701, and moreover, if the data of this patch A is being stored in the GI 1710, then the patch A (401) has the value "GI". But if the data of the patch A is stored in the storage pool 1709 as differential data, then the patch A (401) has the value "Diff". If the patch A is not applied to the guest OS 1702, then the patch A (401) has a value that specifies non applicability (for example " ").

It will be understood that, according to the example of FIG. 6, the patch A is applied to any one of the VMs "Vm01", "Vm02", "Vm03", and "Vm04", and moreover that the data for each of those four patches A is present in the storage pool 1709. Furthermore it will be understood that, according to the example of FIG. 6, the patch D is applied to each of the VMs "Vm09", "Vm10", "Vm11", and "Vm12", and that the data for two of these patches D is present in the storage pool 1709, while the other two patches D are being applied to the GI of "Vm11" and "Vm12".

FIG. 7 shows the structure of the threshold value management table 204.

This threshold value management table 204 includes a capacity threshold value 500 and a proportional threshold value 501.

The capacity threshold value 500 is a threshold value for the capacity for which duplication elimination can be carried out. If the capacity for which duplication elimination can be performed is greater than or equal to this capacity threshold value 500, then duplication elimination is implemented, whereas if the capacity for which duplication elimination can be performed is less than this capacity threshold value 500, then duplication elimination is not implemented.

The proportional threshold value 501 is a threshold value for the ratio of the number of VMs 1701 to which this patch is applied, with respect to the number of VMs 1701 upon which patch duplication elimination is not yet implemented. If this ration is greater than or equal to the proportional threshold value 501, then duplication elimination is implemented, whereas if this ratio is less than the proportional threshold value 501, then duplication elimination is not implemented.

While in this embodiment the capacity threshold value 500 is used, it would also be possible to employ the proportional threshold value 501 instead of the capacity threshold value 500, or in addition thereto. A manager could select either (or both) of the capacity threshold value 500 and the proportional threshold value 501 to be employed, by using a GUI (Graphical User Interface) not shown in the figures of the GI management program 200. The type of threshold value that is used for deciding whether or not to implement duplication elimination is not limited to being only the capacity threshold value 500 or the proportional threshold value 501. It may be anticipated that, by employing this type of threshold value, the undesirable occurrence of high overhead of duplication elimination in proportion to the reduction of storage capacity realized by this duplication elimination may be prevented.

Figure 8:
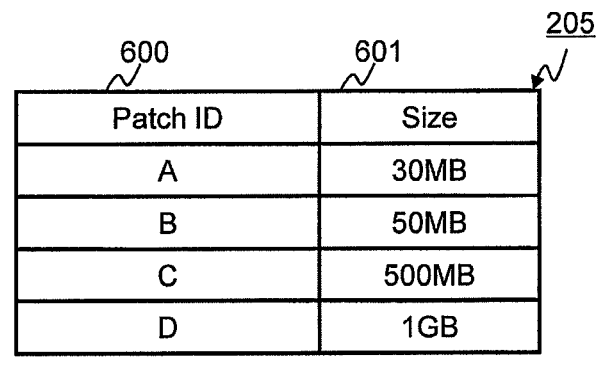

FIG. 8 shows the structure of the patch management table 205.

The patch management table 206 holds, for each patch, for example, the following information: its patch ID 600, and its size 601. In the following, these various items of information will be explained by taking a single patch as an example (in the explanation of FIG. 8, this will be termed the "subject patch").

The patch ID 600 is the ID of the subject patch. The patch includes a program that updates parts or all of some file or files (for example, changes, adds, or deletes them), or a plurality of programs of this type.

The size 601 is the size of the subject patch. This size 601 could also be the storage capacity that is required during installation of the subject patch.

FIG. 9 shows the structure of the patch combination management table 206.

The patch combination management table 206 holds, for each combination of patches, for example, the following information: the combination 700 of patches, its VM IDs 701, its GI LU IDs 702, and a confirmation flag 703. It should be understood that it will be supposed that these combinations of patches do not include any duplications. In the following, these various items of information will be explained by taking a single patch combination as an example (in the explanation of FIG. 9, this will be termed the "subject patch combination").

The combination of patches 700 is the ID of each of the one or more patches that make up the subject patch combination, and that are applied to the same guest OS 1702. If there are no patches in the combination, then the patch combination 700 has the value " ".

The VM IDs 701 is the IDs of each one of all of the VMs to which the subject patch combination is applied.

The GI LU IDs 702 is the IDs (i.e. the LU IDs) of the GIs that hold the master guest OSs to which the subject patch combination is applied.

And the confirmation flag 703 is a value that is used in processing (in a step 2705 that will be described hereinafter) for determining a subject for duplication elimination. In this processing, if the subject patch combination is not yet confirmed, then this confirmation flag 703 has the value "0". And in this processing, if the subject patch combination has now been confirmed, then this confirmation flag 703 has the value "1".

FIG. 10A shows the structure of the first processing management table 207a.

This first processing management table 207a holds, for each VM, for example, the following information: its VM ID 800, its GI LU ID 801, and an added patch 802. In the following, these various items of information will be explained by taking a single VM as an example (in the explanation of FIG. 10A, this will be termed the "subject VM").

The VM ID 800 is the ID of the subject VM 1701. For example, the subject VM may be a VM that accesses a GI other than the GI that includes a virtual disk file in which the same guest OS 1702 is installed, or a snapshot thereof.

The GI LU ID 801 is the ID of the GI (i.e. of the LU) corresponding to the snapshot that the subject VM 1701 uses after the duplication elimination processing.

And the added patch 802 is the ID of a patch that, in the duplication elimination processing, is applied to the guest OS 1702 that is executed on the subject VM.

FIG. 10B shows the structure of the second processing management table 207b.

This second processing management table 207b holds, for each VM, for example, the following information: its VM ID 810, its GI LU ID 811, a copy source 812, and an added patch 813. In the following, these various items of information will be explained by taking a single VM as an example (in the explanation of FIG. 10B, this will be termed the "subject VM").

The VM ID 810 is the ID of the subject VM 1701. For example, the subject VM may be a VM that accesses a GI that includes a virtual disk file in which the same guest OS 1702 is installed.

The GI LU ID 811 is the ID of the GI accessed by the subject VM 1701.

The copy source ID 812 is the ID of the copy source GI when a new GI is to be created by copying a GI accessed by the subject VM 1701.

And the added patch 813 is the ID of a patch that, in the duplication elimination processing, is applied to the guest OS 1702 that is executed on the subject VM.

Figures 11, 12:
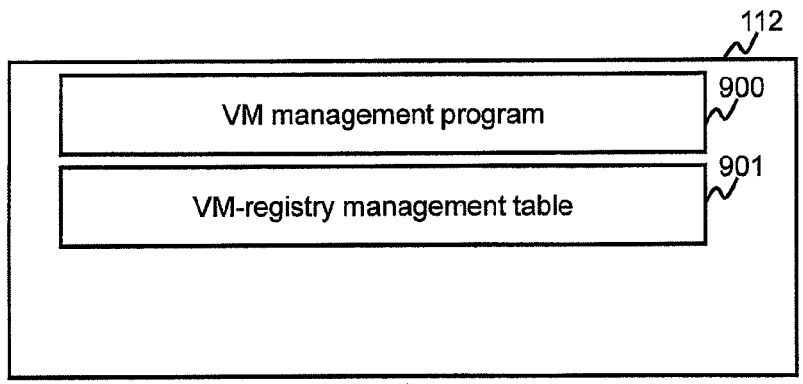
FIG. 11 shows information and a computer program stored in a memory 112 of a computer 102.
FIG. 12 shows the structure of a VM registry management table 901.

FIG. 11 shows information and a computer program stored in the memory 112 of the computer 102.

The memory 112 of the computer 102 stores a VM management program 900 and a VM registry management table 901.

The VM management program 900 emulates physical machines, and starts and stops VMs. The computers for which emulation is performed are virtual machines, in other words VMs.

The VM registry management table 901 holds information that specifies the registries of the guest OSs corresponding to the VMs 1701.

FIG. 12 shows the structure of this VM registry management table 901.

The VM registry management table holds, for each VM, for example, the following information: its VM ID 1000, a registry ID 1001, and a destination for storage 1002. In the following, these various items of information will be explained by taking a single VM as an example (in the explanation of FIG. 12, this will be termed the "subject VM").

The VM ID 1000 is the ID of the subject VM 1701.

The registry ID 1001 is a file name for identifying the individual registry 1106 that has been backed up from the guest OS 1702.

And the destination for storage 1002 is a directory name that identifies the destination for storage of that individual registry 1106.

Figure 13:
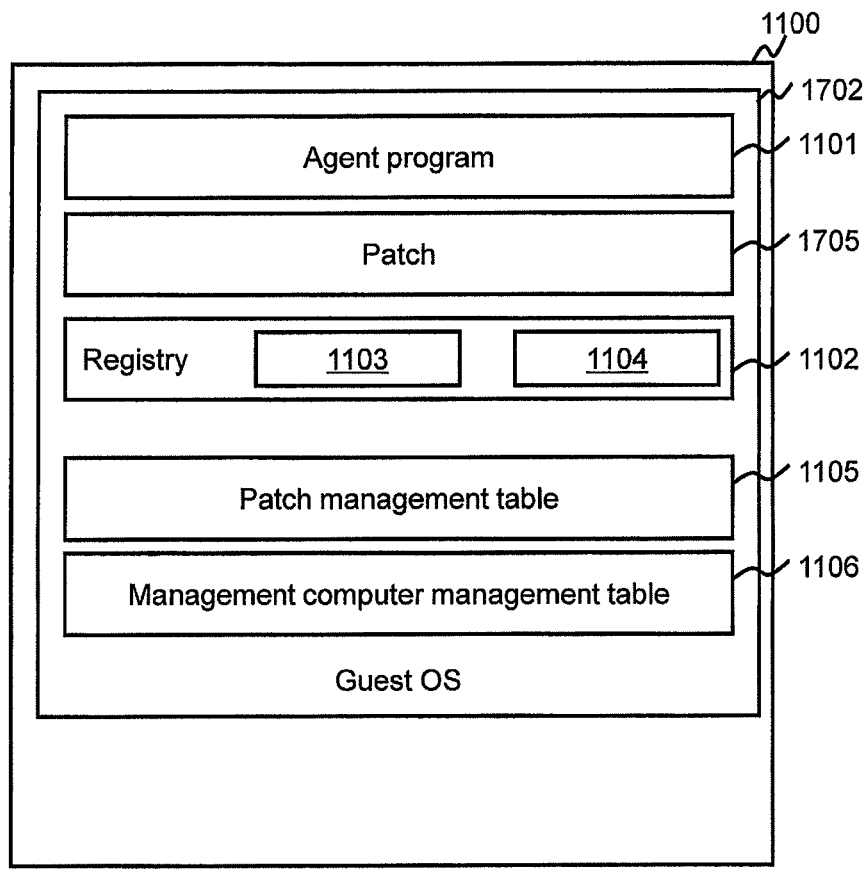
FIG. 13 shows a memory in which a VM is being emulated.

FIG. 13 shows a memory in which a VM is emulated.

The memory 1100 in which the VM is emulated holds a guest OS 1702 that has been read from a virtual disk file.

This guest OS 1702 includes an agent program 1101, a patch 1705, a registry 1102, a patch management table 1105, and a management computer management table 1106. Although this is not shown in the figure, the guest OS 1702 may also include programs such as a kernel and so on that are necessary for executing programs.

The agent program 1101 applies patches to the guest OS 1702, backs up the individual registry 1104, performs recovery, and so on.

The patch 1705 is a program that is applied for updating the guest OS 1705.

The registry 1102 holds the settings of the guest OS. And the registry 1102 consists of a common registry 1103 and an individual registry 1104.

The common registry 1103 is a portion of the registry in which are stored settings that are the same as ones in the registry of the master guest OS.

And the individual registry 1104 is a portion of the registry in which are stored settings that are different from ones in the registry of the master guest OS.

The agent program 1101 holds the settings of the registry for when the VM 1702 initially starts. This registry will be termed the "initial registry". And the individual registry 1104 is differential data from the initial registry to the registry when duplication elimination processing is executed.

The patch management table 1105 holds information related to the patches 1705 applied to the guest OS 1702.

And the management computer management table 1106 holds information related to the management computer 101.

Figure 14:
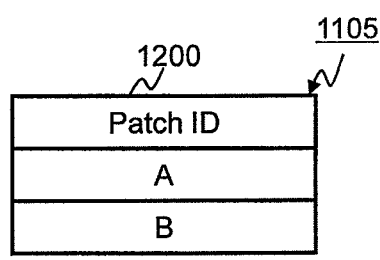
FIG. 14 shows the structure of a patch management table 1105.

FIG. 14 shows the structure of the patch management table 1105.

This patch management table 1105 holds patch IDs 1200.

These patch IDs 1200 are IDs of patches applied to the guest OS 1705. These could be patches applied by the user of the VM 1701, or could be ones periodically applied by the agent program 1101.

Figure 15:
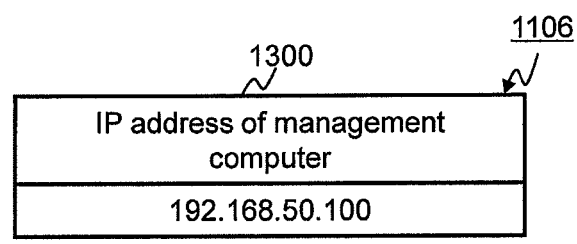
FIG. 15 shows the structure of a management computer management table 1106.

FIG. 15 shows the structure of the management computer management table 1106.

This management computer management table 1106 holds the IP address 1300 of the management computer.

This IP address 1300 is information specifying the IP address that is set for the management computer 101. This management computer management table 1106 is stored in the master guest OS. The agent program 1101 can communicate with the management computer 101 by referring to this management computer table 1106.

Figure 16:
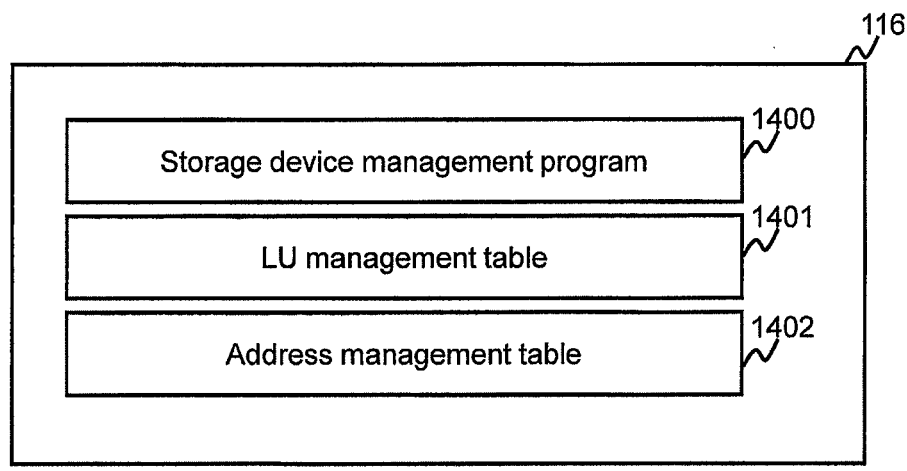
FIG. 16 shows information and computer programs stored in a memory 116 of a storage device 103.

FIG. 16 shows information and a computer program stored in the memory 116 of the storage device 103.

The memory 116 of the storage device 103 stores a storage device management program 1400, an LU management table 1401, and an address management table 1402.

The storage device management program 1400 copies GIs and acquires snapshots. This storage device management program 1400 may construct a RAID (Redundant Array of Independent (or Inexpensive) Disks) group structure that uses the plurality of SSDs 121. The collection of a plurality of drives that make up a RAID will be referred to as a "RAID group". Or the storage device management program 1400 may also construct a RAID group structure that uses the plurality of HDDs 122. And the storage device management program 1400 may create an LU that is a logical drive in which a portion of all of the storage region of the RAID group is guaranteed. When creating an LU, the storage device management program 1400 may also create a virtual LU in which the storage region is not guaranteed. In this case, when writing data into this virtual LU, the storage device management program 1400 should guarantee the storage region required for writing the data.

The LU management table 1401 holds information related to the snapshots 1708.

And the address management table 1402 holds information specifying the addresses of storage regions corresponding to the addresses of the snapshots 1708.

FIG. 17 shows the structure of the LU management table 1401.

This LU management table 1401 holds for each snapshot, for example, the following information: the LU ID 1500 of the snapshot, its GI LU ID 1501, and its LU size 1502. In the following, these various items of information will be explained by taking a single snapshot as an example (in the explanation of FIG. 17 this will be termed the "subject snapshot").

The LU ID 1500 of the snapshot is the ID (for example "LUN") of the subject snapshot (LU).

The GI LU ID 1501 is the ID (for example "LUN") of the GI corresponding to the subject snapshot (LU) (i.e. of the GI that is the base of the subject snapshot).

The LU size 1502 is the size of the GI (LU) corresponding to the subject snapshot.

FIG. 18 shows the structure of the address management table 1402.

This address management table 1402 holds, for each block that makes up the snapshot, for example, the following information: the LU ID 1600 of the snapshot, the address 1601 of the LU of the snapshot, the storage region LU ID 1602, and the storage region address 1603. In the following, these various items of information will be explained by taking a single block within a snapshot as an example (in the explanation of FIG. 18, this will be termed the "subject block").

The LU ID 1600 of the snapshot is the ID (for example "LUN") of the snapshot (LU) that includes the subject block.

The address 1601 of the LU of the snapshot is information that specifies the address of the subject block.

The storage region LU ID 1602 is the ID (for example "LUN") of the LU that holds the block in which the block data within the subject block is stored (i.e. of the LU corresponding to the snapshot that includes the subject block). After acquisition of a snapshot of a GI, this storage region LU ID 1602 becomes the ID of the GI (for example "LUN").

And the storage region address 1603 is information that specifies the address of the block (the block within the GI or the block within the storage pool) in which the block data within the subject block is stored.

According to the example of FIG. 18, it will be understood that the block data within the block "0001" of the snapshot "ss01" is present in the block "0001" of the GI "gi01". Moreover, according to the example of FIG. 18, it will be understood that the block data within the block "0003" of the snapshot "ss01" is present in the block "0001" of the storage pool "sp01".

In the following, a summary of this embodiment will be conceptually explained with reference to FIGS. 19 through 25.

Figure 19:
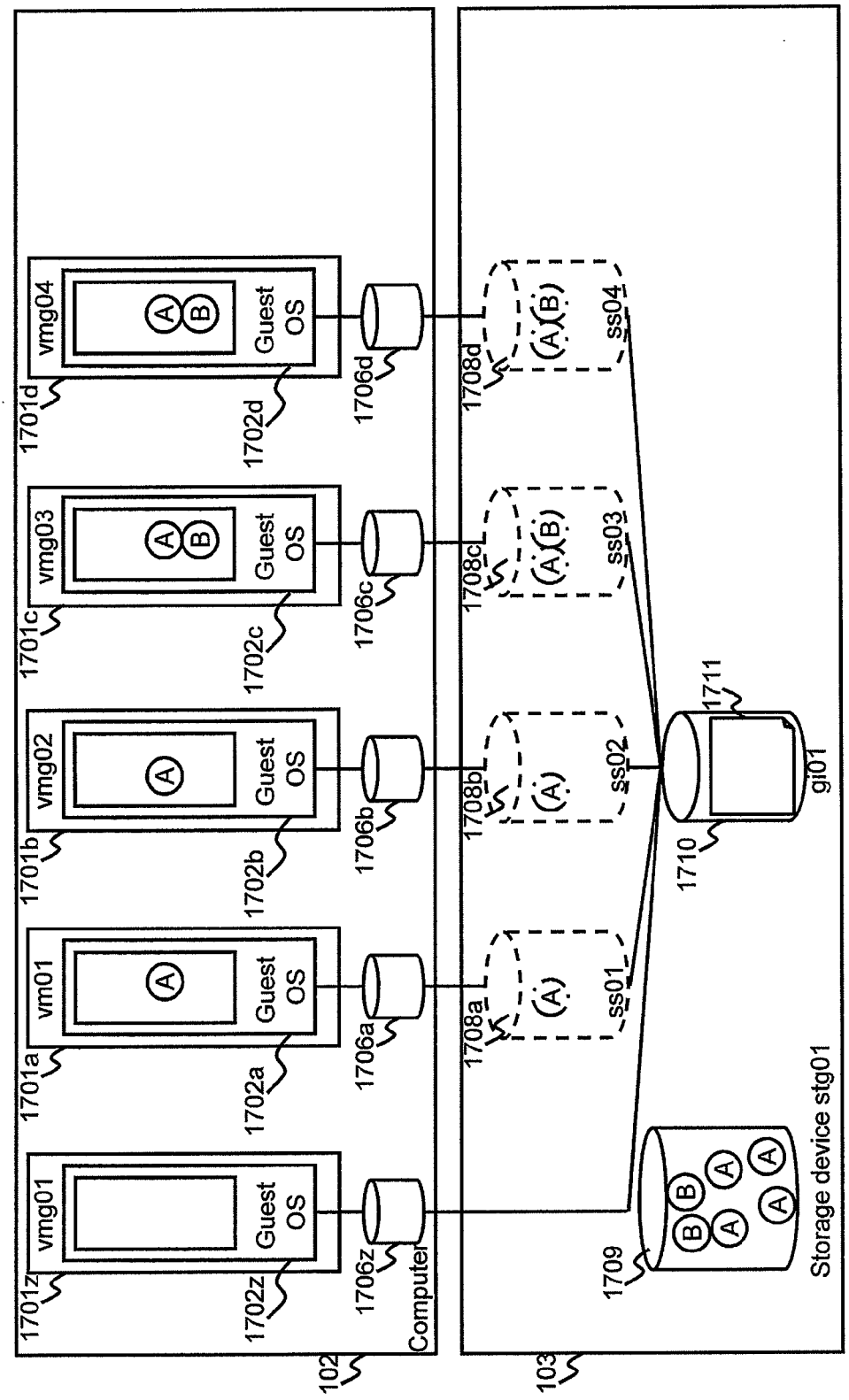
FIG. 19 shows a first example of logical structure, for a case in which a patch is applied to a plurality of VMs.

FIG. 19 shows a first example of a logical structure for a case in which a patch is applied to a plurality of VMs.

The guest OSs that are executed by the VMs 1701z, 1701a, 1701b, 1701c, and 1701d are 1702z, 1702a, 1702b, 1702c, and 1702d.

Snapshots 1708a, 1708b, 1708c, and 1708d are snapshots of a GI 1710 that holds a virtual disk file 1711. The LU 1706z is due to mounting of the GI 1710. And the LUs 1706a, 1706b, 1706c, and 1706d are due to mounting of the snapshots 1708a, 1708b, 1708c, and 1708d.

The patch A is applied to the guest OS 1702a and to the guest OS 1702b. This applied patch A is stored in the snapshots 1708a and 1708b. In other words, two copies of the patch A are stored in the storage pool 1709.

The patch A and the patch B are applied to the guest OS 1702c and to the guest OS 1702d. These applied patches A and B are stored in the snapshots 1708c and 1708d. In other words, two more copies of the patch A and two copies of the patch B are stored in the storage pool 1709.

Figure 20:
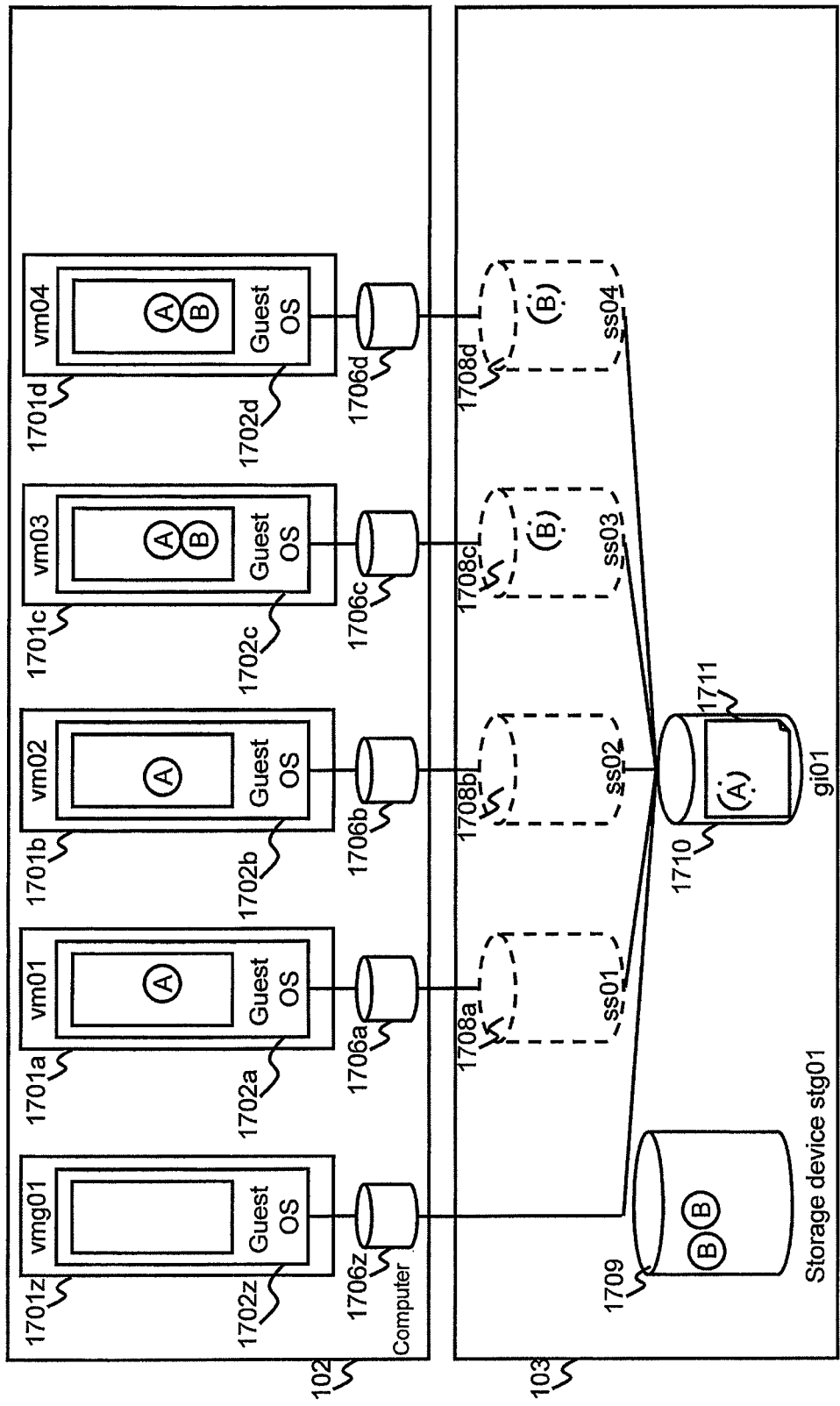
FIG. 20 shows a logical structure after duplication elimination of a first type has been performed upon the logical structure shown in FIG. 19.

FIG. 20 shows the logical structure after duplication elimination of a first type has been performed upon the logical structure shown in FIG. 19.

According to the logical structure shown in FIG. 19, the patch A is applied to all of the guest OSs 1702a through 1702d, and consequently four copies of the patch A are stored in the storage pool 1709 as differential data for the four snapshots 1708a through 1708d.

Duplication elimination of the first type is duplication elimination for performing patch duplication elimination by not copying a GI. According to this duplication elimination of the first type, with a GI that is common to a plurality of snapshots, a patch in common that is stored in all of that plurality of snapshots is stored in that GI, and the plurality of patches in common that correspond to that plurality of snapshots are deleted from the storage pool 1709. In concrete terms, for example, according to this duplication elimination of the first type, the patch A which is differential data for each of the four snapshots 1708a through 1708d is stored in the GI 1710 that is common to the four snapshots 1708a through 1708d (i.e., the patch A is applied to the virtual disk 1711 of the common GI 1710). Due to this, four copies of the patch A are deleted from the storage pool 1709, and accordingly the consumption of storage capacity is reduced.

Figure 21:
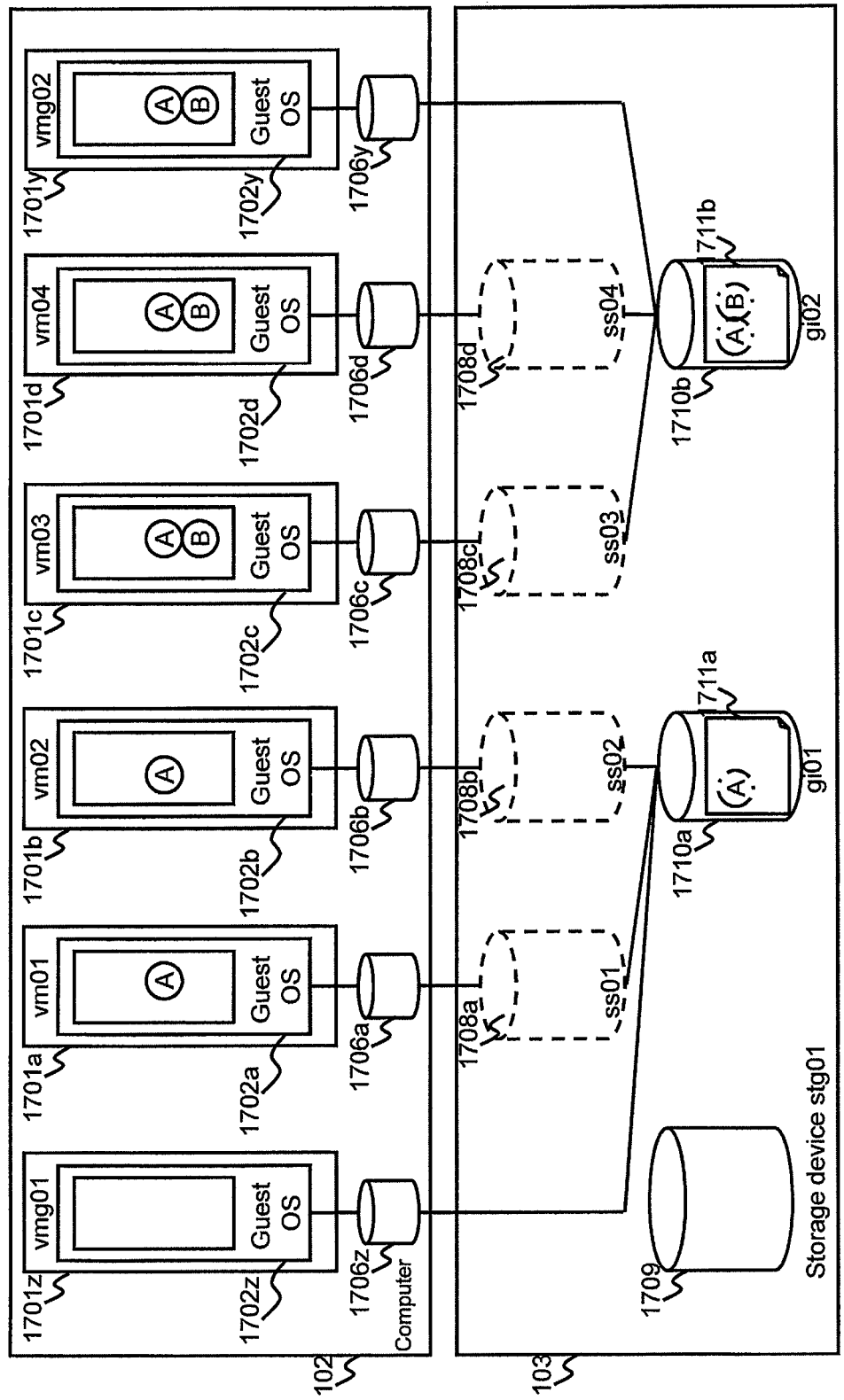
FIG. 21 shows a logical structure after duplication elimination of a second type has been performed upon the logical structure shown in FIG. 19.

FIG. 21 shows the logical structure after duplication elimination of a second type has been performed upon the logical structure shown in FIG. 19.

This duplication elimination of the second type is duplication elimination for performing patch duplication elimination by copying a GI. According to this duplication elimination of the second type, for each patch combination that is common to two or more snapshots 1708, a copy of the GI that is common to the plurality of snapshots is created. And, according to this duplication elimination of the second type, the patch combination (one or more patches) is stored in the copy of the GI, and the plurality of common patch combinations (one or more patches) that correspond to each of those two or more snapshots are deleted from the storage pool 1709. In concrete terms, for example, according to this duplication elimination of the second type, the following processes (1) through (4) are performed.

(1) A first patch combination (the patch A) that is common to the snapshots 1708a and 1708b and a second patch combination (the patch A and the patch B) that is common to the snapshots 1708c and 1708d are specified as being patch combinations that are common to two or more of the snapshots 1708. In other words, two patch combinations are specified.

(2) Since the number of patch combinations that have been specified is two, a single copy is created as a copy of the GI that is common to the snapshots 1708a through 1708d. Due to this, a second GI 1710b is made available, and is a copy of the first GI 1710a (i.e. of the GI that is common to the snapshots 1708a through 1708d).

(3) The first GI 1710a is utilized for duplication elimination of the first patch combination (consisting of the patch A). In concrete terms, the first patch combination (i.e. the patch A) is stored in the first GI 1710a (i.e. the patch A is applied to the virtual disk file 1711a of the first GI 1710a). Due to this, two patch combinations (each consisting of the patch A) corresponding to each of the snapshots 1708a and 1708b are deleted from the storage pool 1709.

(4) The second GI 1710b is utilized for duplication elimination of the second patch combination (consisting of the patch A and the patch B). In concrete terms, the second patch combination (i.e. the patch A and the patch B) is stored in the second GI 1710b (i.e. the patches A and B are applied to the virtual disk file 1711b of the second GI 1710b). Due to this, the two patch combinations (consisting of the patch A and the patch B) corresponding to each of the snapshots 1708c and 1708d are deleted from the storage pool 1709. In other words, two sets each consisting of the patch A and the patch B are deleted from the storage pool 1709.

It should be understood that the VM 1701y to which the same patch combination (i.e.

the patch A and the patch B) is applied may be allocated to the guest OS 1702y as a master of the second GI 1710b (i.e. as a copy of that GI).

Figure 22:
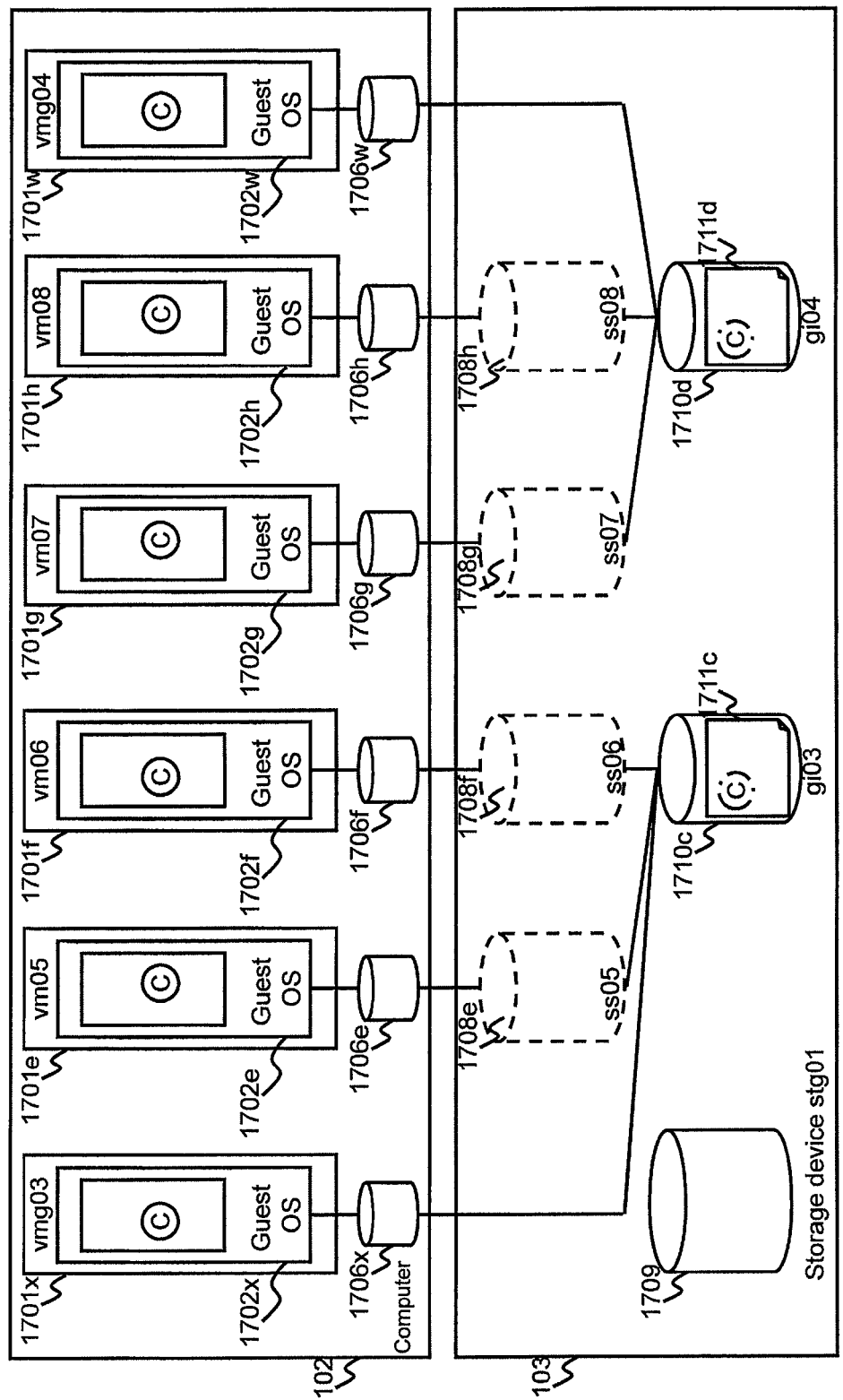
FIG. 22 shows a second example of logical structure, for a case in which a patch is applied to a plurality of VMs.

FIG. 22 shows a second example of logical structure, for a case in which a patch is applied to a plurality of VMs.

The patch C is applied to all of the guest OSs 1702x, 1702e, 1702f, 1702g, 1702h, and 1702w that are executed by the VMs 1701x, 1701e, 1701f, 1701g, 1701h, and 1701w.

The first GI 1710c is the one that has the first virtual disk file 1711c, and the snapshots 1708e and 1708f are snapshots of that first GI 1710c. And the guest OS 1702x is executed by the VM 1701x as the master of the first GI 1710c. The LU 1706x is due to the mounting of the first GI 1710c. Moreover, the LUs 1706e and 1706f are due to the mounting of the snapshots 1708e and 1708f.

The second GI 1710d is the one that has the second virtual disk file 1711d, and the snapshots 1708g and 1708h are snapshots of the second GI 1710d. And the guest OS 1702w is executed by the VM 1701w as the master of the second GI 1710d. The LU 1706w is due to the mounting of the second GI 1710d. And the LUs 1706g and 1706h are due to the mounting of the snapshots 1708g and 1708h.

The virtual disk files 1711c and 1711d are the same. Even if the patch C is not applied to the virtual disk files 1711c and 1711d, still the virtual disk files 1711c and 1711d are the same.

Figure 23:
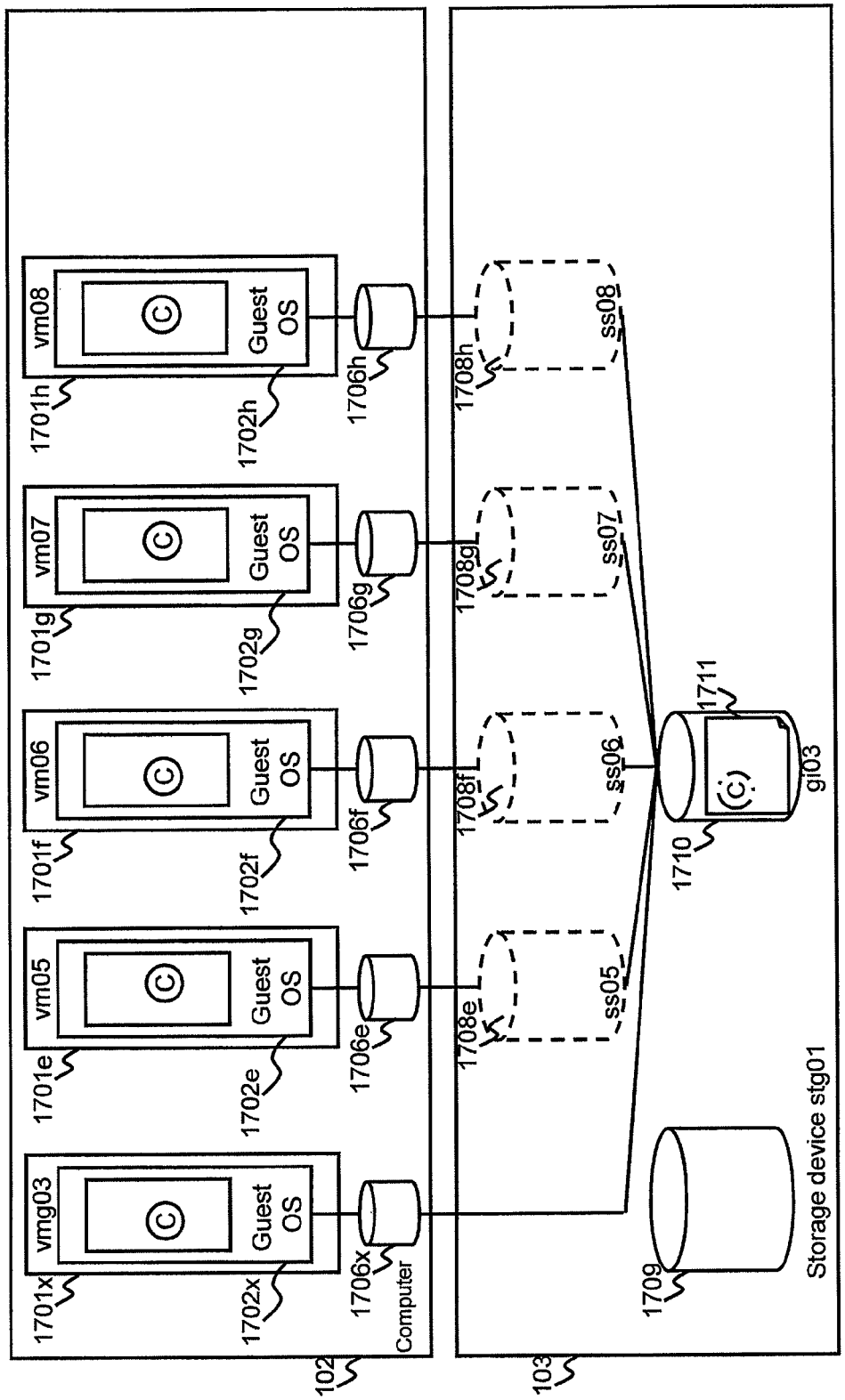
FIG. 23 shows a logical structure after duplication elimination of a third type has been performed upon the logical structure shown in FIG. 22.

FIG. 23 shows the logical structure after duplication elimination of a third type has been performed upon the logical structure shown in FIG. 22.

This duplication elimination of the third type is processing for deleting all of the GIs (i.e. the virtual disk files) among a plurality of GIs that have the same virtual disk file, except for a predetermined number of GIs (typically, a single GI).

In concrete terms, according to this duplication elimination of the third type, one of the first GI and the second GI is deleted, for example the second GI 1710c (i.e. the virtual disk file 1711c). And the snapshots 1708g and 1708h become snapshots of the GI 1710c that remains and is not deleted.

Figure 24:
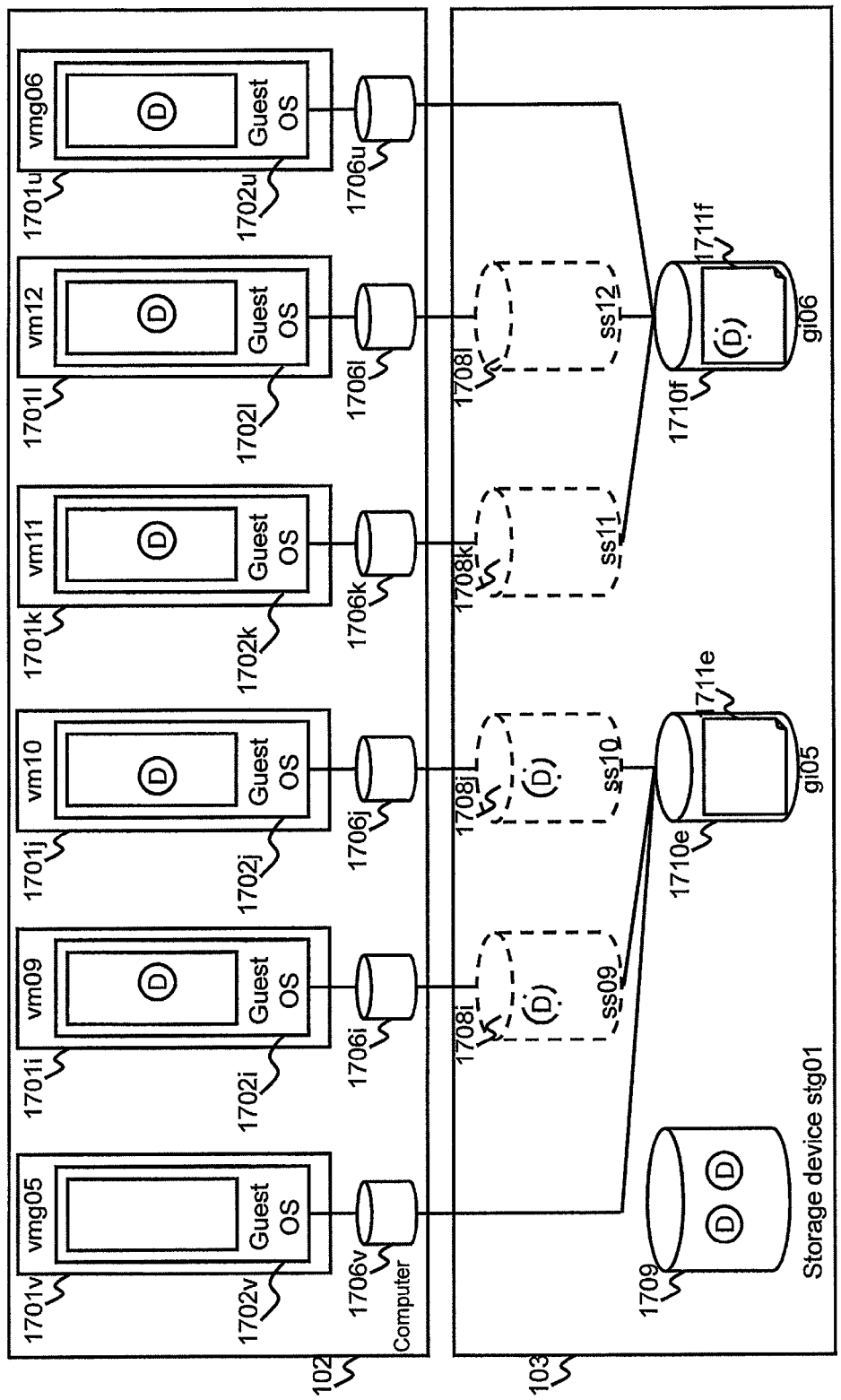
FIG. 24 shows a third example of logical structure, for a case in which a patch is applied to a plurality of VMs.

FIG. 24 shows a third example of logical structure, for a case in which a patch is applied to a plurality of VMs.

The patch D is applied to the guest OSs 1702i, 1702j, 1702k, 1702l, and 1702u that are executed by the VMs 1701i, 1701j, 1701k, 1701l, and 1701u. The patch D is not applied to the guest OS 1702v that is executed by the VM 1701v.

The first GI 1710e is the GI that has the first virtual disk file 1711e, and the snapshots 1708i and 1708j are snapshots of the first GI 1710e. And the guest OS 1702v is executed by the VM 1701v as the master of the first GI 1710e. The LU 1706v is due to the mounting of the first GI 1710e. Moreover, the LUs 1706i and 1706j are due to the mounting of the snapshots 1708i and 1708j.

The second GI 1710f is the one that has the second virtual disk file 1711f, and the snapshots 1708k and 1708l are snapshots of the second GI 1710f. And the guest OS 1702u is executed by the VM 1701u as the master of the second GI 1710f. The LU 1706u is due to the mounting of the second GI 1710f. And the LUs 1706k and 1706l are due to the mounting of the snapshots 1708k and 1708l.

If the patch D is not applied to the virtual disk file 1711f, the virtual disk files 1711e and 1711f are the same.

Figure 25:
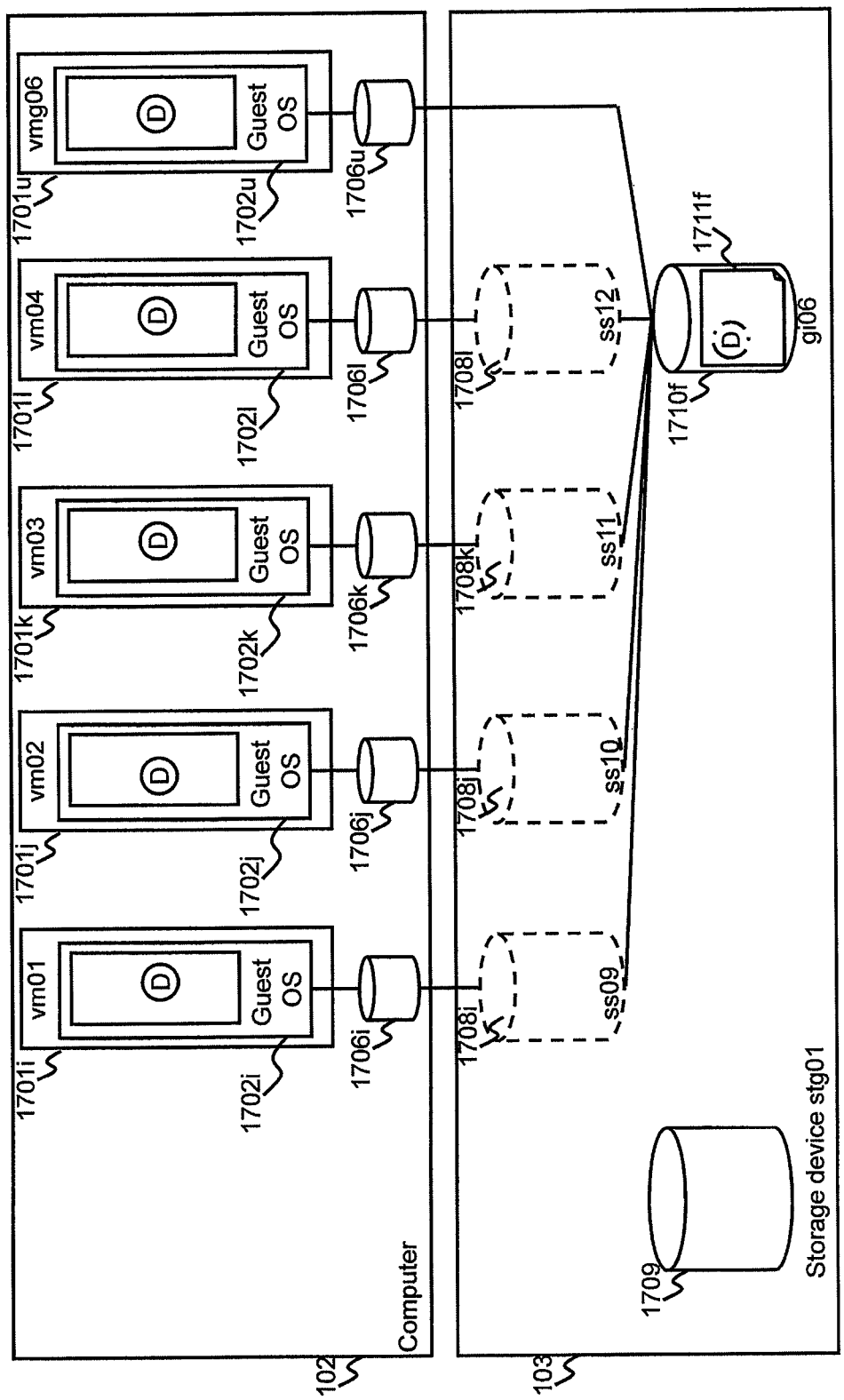
FIG. 25 shows a logical structure after duplication elimination of a fourth type has been performed upon the logical structure shown in FIG. 24.

FIG. 25 shows the logical structure after duplication elimination of a fourth type has been performed upon the logical structure shown in FIG. 24.

This duplication elimination of the fourth type is a combination of the duplication elimination of the first type and the duplication elimination of the third type. In other words, the common patches that are stored in all of a plurality of snapshots are stored in a GI that is common to that plurality of snapshots, and the plurality of common patches that correspond to each of that plurality of snapshots are deleted from the storage pool 1709. According to the duplication elimination of the first type, if a plurality of GIs have been created that have the same virtual disk file, then all of the GIS (i.e. the virtual disk files) among that plurality of GIs except for a predetermined number of GIs (typically, a single GI) are deleted.

In concrete terms, according to this duplication elimination of the fourth type, the following processes (1) and (2) are performed.

(1) The patch D that is common to the two snapshots 1708i and 1708j is stored in the GI 1710e that is common to those two snapshots 1708i and 1708j, and the two copies of the patch D that is common to those snapshots 1708i and 1708j are deleted from the storage pool 1709. Due to this processing, the GI 1710e becomes the same as the GI 1710f.

(2) One of the GIs among the two GIs 1710e and 1710f is deleted, i.e. the GI 1710e, and the snapshots 1708i and 1708j that correspond to this GI 1710e are converted into snapshots of the GI 1710f.

Figure 26:
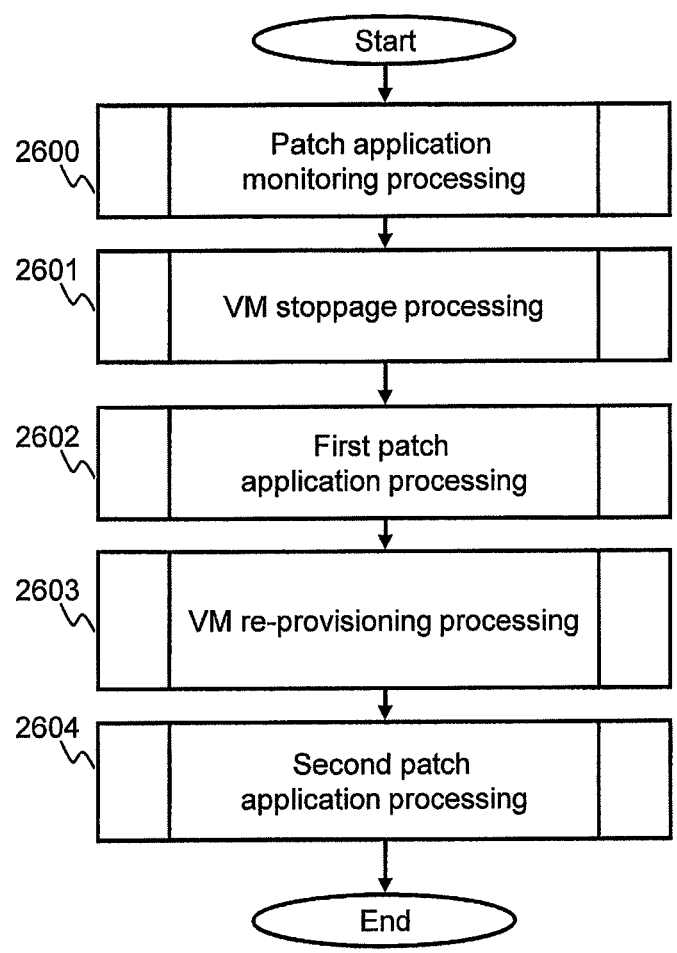
FIG. 26 shows a flow chart for duplication elimination processing.

FIG. 26 is a flow chart for the duplication elimination processing.

Figure 31:
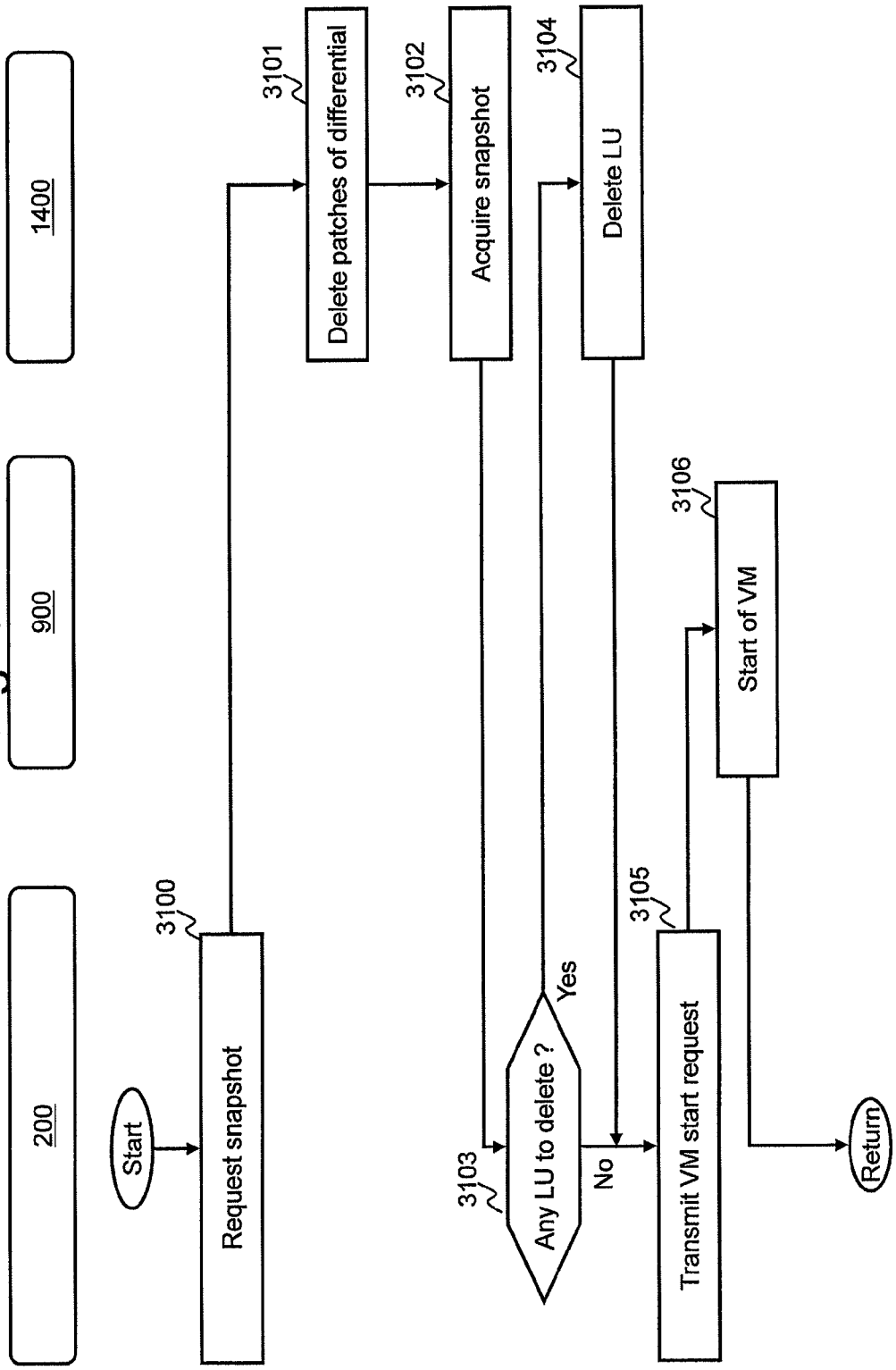
FIG. 31 shows a flow chart for VM re provisioning processing.
Figure 32:
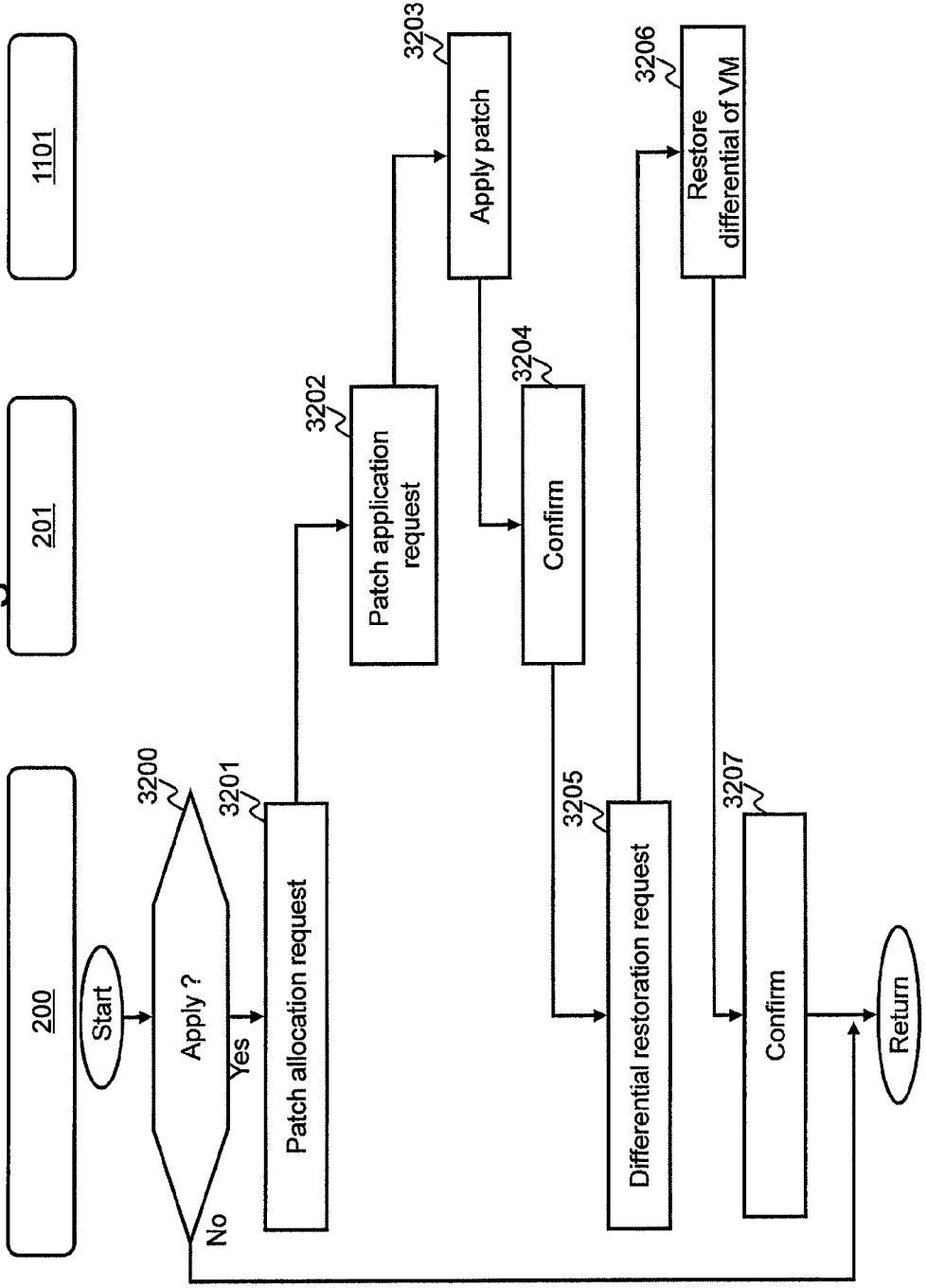
FIG. 32 shows a flow chart for second patch application processing.

This duplication elimination processing includes patch application monitoring processing (a step 2600, FIGS. 27 and 28), VM stoppage processing (a step 2601, FIG. 29), first patch application processing (a step 2602, FIG. 30), VM re provisioning processing (a step 2603, FIG. 31), and second patch application processing (a step 2640, FIG. 32).

The GI management program 200 executes the duplication elimination processing at intervals specified in advance. It would also be acceptable for a manager to execute the GI management program 200 manually, using a GUI thereof not shown in the figures. Thus, a GUI of the GI management program 200 may provide an interface via which the duplication elimination processing can be executed.

It is supposed that no work is performed upon the LUs during this execution of the duplication elimination processing, apart from the reading and the writing that are necessary for the duplication elimination processing.

Figure 27:
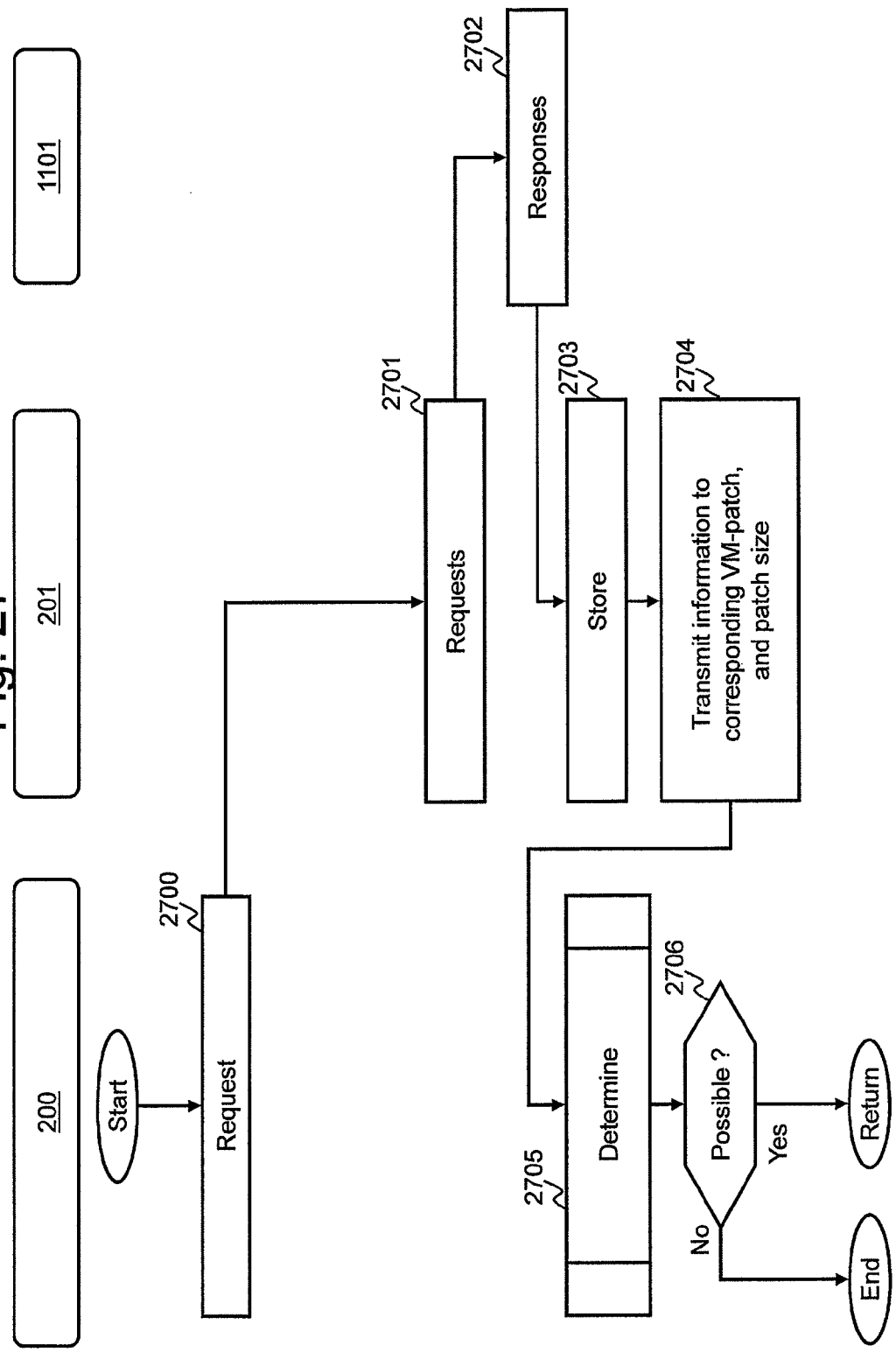
FIG. 27 shows a flow chart for patch application monitoring processing.

FIG. 27 shows a flow chart for the patch application monitoring processing.

In the following explanation, applying a patch to the guest OS 1702 of the VM 1701 is sometimes termed "applying a patch to the VM 1701". Moreover, a patch 1705 that has been applied to the guest OS 1702 of the VM 1701 is sometimes termed "a patch 1705 of the VM 1701".

In a step 2700, the GI management program 200 transmits to the patch update management program 201 a request to acquire information held in the VM patch management table 203.

Then in a step 2701, upon receipt of the request of the step 2700, the patch update management program 201 acquires information held in the LU VM management table 202 in which the IP address 303 is specified, and transmits to the agent program 1101 of each VM 1701 a request to acquire information held in the patch management table 1105.

Then in a step 2702, upon receipt of the request of the step 2701, each of the agent programs 1101 acquires the information in the patch management table 1105 in which the patch ID 1200 is specified, and transmits the information that has been acquired (i.e. the patch ID) to the patch update management program 201.

Then in a step 2703, upon receipt of the responses to the requests of the step 2701 (i.e. upon receipt of the patch IDs), the patch update management program 201 registers the value "Diff" in the corresponding fields in the VM patch management table 203 (i.e. in the fields corresponding to the responses (the patch IDs) that have been received and to all of the VM IDs 400). The value "GI" is registered only if this is a patch that is applied to the VM 1701 of the GI 1710 in the step 3006 (refer to FIG. 30). Due to this, if the value "GI" is already registered in the corresponding field, then the value "Diff" is not registered in that corresponding field. "Diff" is only registered in a corresponding field in which the value " " is registered. If there is no column corresponding to the above described response (i.e. to the patch ID), then the patch update management program 201 adds a column corresponding to this patch ID.

Then in a step 2704, as a response to the request of the step 2700, the patch update management program 201 transmits to the GI management program 200 the information held in the VM patch management table 203 and the information held in the patch management table 205.

Then in a step 2705, upon receipt of the response of the step 2704, the GI management program 200 executes processing to determine a subject (i.e. a patch combination) for duplication elimination. This step 2705 will be described hereinafter with reference to FIG. 28.

Then in a step 2706 the GI management program 200 makes a decision as to whether or not the VM ID 800 s registered in the processing management table 207.

If it has been decided that the VM ID 800 is registered (YES in the step 2706), then the GI management program 200 executes a step 2900.

But, if it has been decided that the VM ID 800 is not registered (NO in the step 2706), then the GI management program 200 terminates this duplication elimination processing.

Figure 28:
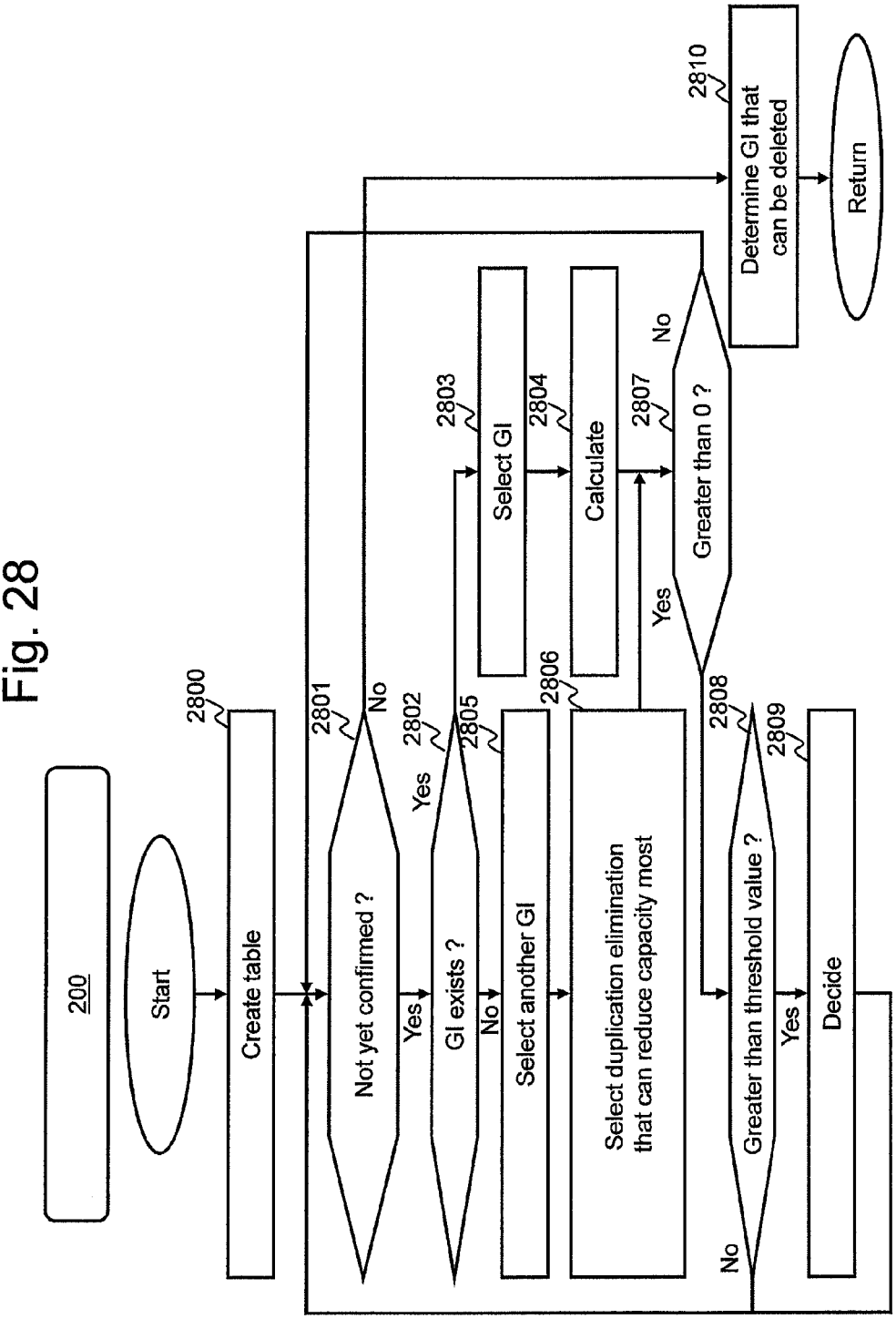
FIG. 28 shows a flow chart for processing for determining a subject for duplication elimination.

FIG. 28 shows a flow chart for the processing for determining the subject for duplication elimination.

In this processing for determining the subject for duplication elimination, the GI management program 200 creates a new patch combination management table 206, a new first processing management table 207a, and a new second processing management table 207b.

In the step S2800, the following processing is performed.

(1) The GI management program 200 creates a blank patch combination management table 206. And the GI management program 200 executes in order the following processing of the step 2800 for all of the VMs 1701 that correspond to all of the VM IDs 400. In the explanation of FIG. 28, the VM 1701 during execution of the step 2800 will be termed the "target VM".

(2) The GI management program 200 specifies a patch combination corresponding to the target VM from the VM patch management table 203.

(3) If information specifying the specified patch combination is not registered as a patch combination 700 in the patch combination management table 206, then the GI management program 200 registers information specifying the specified patch combination as the patch combination 700. And if the target VM is a VM 1701 to which not even one patch is applied, then the GI management program 200 registers " " as the patch combination 700.

(4) The following (4-1) or (4-2) is performed.

(4-1) If information specifying the specified patch combination is registered as a patch combination 700 in the patch combination management table 206, and moreover the target VM is not the VM 1701 of the GI 1710, then the GI management program 200 additionally registers the ID (301) of the target VM as a VM ID 701 for the corresponding patch combination 700.

(4-2) However, if information specifying the specified patch combination is registered as a patch combination 700 in the patch combination management table 206, and moreover the target VM is the VM 1701 of the GI 1710, then the GI management program 200 additionally registers the ID (304) of the target VM as a GI LU ID 702. It is possible to decide whether or not the LU accessed by the target VM is the GI 1710, by comparing together the LU ID 300 corresponding to the target VM and the GI LU ID 304. If these are not the same, then the LU that the target VM accesses is not the GI.

(5) After the processing of (1) through (4) described above has been executed for the VMs 1701 corresponding to all of the VM IDs 400, then the GI management program 200 registers "0" for all of the confirmation flags 703, and registers " " as the GI LU ID 702 for which nothing is registered.

(6) Next, the GI management program 200 performs structuring of the patch combination management table 206, and sorts it in ascending order by total size of the patch combinations.

Then in the step 2801, the GI management program 200 makes decisions in order from the top of the patch combination management table 206 (i.e. in ascending order of the total sizes of the patch combinations), as to whether or not the confirmation flags 703 that correspond to the patch combinations 700 are "0". In the explanation of FIG. 28 (and of FIG. 41), the patch combination 700 for which processing is being executed will be termed the "target combination". If it has been decided that the confirmation flag 703 is "0" (YES in the step 2801), then the GI management program 200 executes a step 2802. But if it has decided that the confirmation flag 703 is not "0" (NO in the step 2801), then the GI management program 200 executes a step 2810.

In the step 2802, the GI management program 200 makes a decision as to whether or not there is a GI LU ID 702 corresponding to the target combination. If it has been decided that there is such a GI LU ID 702 (YES in the step 2802), then the GI management program 200 executes a step 2803. But if it has been decided that there is no such GI LU ID 702 (NO in the step 2802), then the GI management program 200 executes a step 2805.

Then in the step 2803, the GI management program 200 selects a GU LU ID 702 corresponding to the target combination which was found firstly as the GI to be used in duplication elimination of the target combination. In other words, a GI corresponding to a snapshot of the VM 1701 of the target combination (i.e. a GI that is the acquisition source for a snapshot) is selected for when performing duplication elimination of the target combination. Sometimes, in the explanation of FIG. 28, a GI that can become the source of acquisition of the snapshot is termed the "target GI".

Then in the step 2804, the GI management program 200 acquires information in which the VM ID 701 corresponding to the target combination is specified, information held in the VM patch management table 203, and information held in the patch management table 205, and obtains the capacity for which duplication elimination can be performed on the basis of those items of information. In concrete terms, the GI management program 200 performs the following processes for all of the VMs 1701 that are registered as VM IDs 701:

(*) acquisition of information that gives the sizes 601 corresponding to patches 1705 for which "Diff" is present in the VM patch management table 203; and (*) on the basis of this acquired information, calculation of the total size of the patches for which "Diff" is present.

The total size that has been calculated is the capacity for which duplication elimination can be performed when the target GI is used. In the case where, in step 2803, there are a plurality of GU LU IDs 702 corresponding to the target combination which was found firstly, a first capacity is added to the capacity for which duplication elimination can be carried out. The first capacity is the LU size 306 of GI 1710 corresponding to the GI LU ID 702 except LU ID 702 of GI which was found firstly.

Then in the step 2807 the GI management program 200 makes a decision as to whether or not the capacity for which duplication elimination of the target combination can be performed is greater than or equal to zero. If the capacity for which duplication elimination of the target combination can be performed is greater than or equal to zero (YES in the step 2807), then the GI management program 200 executes a step 2808. But if the capacity for which duplication elimination of the target combination can be performed is not greater than or equal to zero, then the GI management program 200 executes the step 2801 for some patch combination 700 for which the step 2801 has not yet been performed.

Then in the step 2808, the GI management program 200 makes a decision as to whether or not the capacity for which duplication elimination can be performed is greater than the capacity threshold value 500. It should be understood that, if a setting is established to use the proportional threshold value 501 instead of, or in addition to, the capacity threshold value 500, then the GI management program 200 makes a decision as to whether or not the ratio of the number of VMs 1701 to which the target combination is applied, to the number of VMs 1701 for which duplication elimination of the target combination has not yet been implemented, is greater than the proportional threshold value 501. If the result of the decision in this step 2808 is affirmative (YES in the step 2808), then the GI management program 200 executes a step 2809. But if the result of the decision in this step 2808 is negative (NO in the step 2808), then the GI management program 200 executes the step 2801 for a patch combination 700 for which the step 2801 has not yet been performed.

Then in the step 2809, the GI management program 200 determines the target combination as being the patch combination to become the subject of duplication elimination processing. In concrete terms, in this step 2809, the following processes are performed:

(1) When performing duplication elimination of any of the first type through the fourth type, the GI management program 200 registers information in which the VM ID 701 corresponding to the target combination is specified in the first processing management table 207*a* as the VM ID 800.

(2) If there is some GI 1710 to which the target combination is applied, then the GI management program 200 registers, as the GI LU ID 801 corresponding to the VM ID 800 registered in (1) above, information in which the target GI LU ID 300 that was selected in the step 2803 is specified. Furthermore, the GI management program 200 specifies, among the target combinations, patches that are not applied to the target GI, and registers information in which the patch IDs 600 of these patches are specified as added patches 802.

(3) When performing duplication elimination of the first type, the GI management program 200 registers information in which the target GI LU ID 300 selected in the step 2805 is specified as the GI LU ID 801 corresponding to the VM ID 800 that has been registered. Moreover, among the target combinations, the GI management program 200 specifies patches that are not applied to the target GI, and registers information specifying the patch IDs 600 of these patches as added patches 802. It should be understood that which of duplication elimination of the first type and duplication elimination of the second type is to be performed, is determined in a step 2806 that will be described hereinafter.

(4) When performing duplication elimination of the second type, the GI management program 200 registers information in which the target GI LU ID 300 is specified as the copy source 812 corresponding to the VM ID 800 that has been registered.

(5) After (1) through (4), the GI management program 200 performs the following.

(*) The GI management program 200 selects a single ID from the one or more unused LU IDs, and registers this ID as a corresponding GI LU ID 811 in the registered GI LU IDs 812. Moreover, when calculating the capacity upon which duplication elimination can be performed, the GI management program 200 registers information in which is specified the ID 600 of the patch that it has been decided to apply to the target GI as an added patch 813 corresponding to a registered GI LU ID 812.

(*) The GI management program 200 selects a single ID from the one or more unused VM IDs, and registers this ID in the registered GI LU IDs 812 as corresponding VM ID 810. Furthermore, the GI management program 200 registers information in which the registered GI LU ID 811 is specified as the GI LU ID 801 corresponding to the VM ID 800 to which the corresponding target combination is applied.

(*) The GI management program 200 registers information relating to the newly created VM in the LU VM management table 202. In concrete terms, the GI management program 200 registers information in which the GI LU ID 811 registered by the previous processing is specified as the LU ID 300 and the GI LU ID 304. Moreover, the GI management program 200 registers information in which the VM ID 810 corresponding to the newly created VM is specified, as the VM ID 301. Furthermore, the GI management program 200 registers a LU size corresponding to the copy source 812 as the LU size 305. Yet further, the GI management program 200 registers a storage device ID corresponding to the GI LU ID 811 as the storage device ID 306. Even further, the GI management program 200 registers the ID of the guest OS executed by the VM corresponding to the GI LU ID 811 as the guest OS 302. Still further, the GI management program 200 registers an unused IP address as the VM IP address 303.

(*) The GI management program 200 updates the confirmation flag 703 corresponding to the target combination to "1".

However, as previously described, if the result of the decision in the step 2802 (i.e.

the decision as to whether or not there is a GI LU ID 702 corresponding to the target combination) is negative (NO in the step 2802), then the step 2805 is performed.

In this step 2805, the GI management program 200 performs the following processing.

(1) The GI management program 200 makes a decision as to whether or not a GI LU ID 702 corresponding to any associate target combination is registered. Here the "associate target combination" is a combination, among the combinations that can be created by using the patches making up the target combination, with the exception of the target combination itself. This decision is performed in descending order of total size of the associate target combinations.

(2) In the decision (1) described above, the GI management program 200 selects, as the target GI, the GI 1710 corresponding to the GI LU ID 702 that was initially registered.

(3) If no GI LU ID 702 is found in the decision (1) described above, then the GI management program 200 selects, as the target GI, a GI 1710 corresponding to the GI LU ID 702 to which not even one patch is applied. In the case where there are a plurality of GU LU IDs 702 corresponding to the associate target combination, a second capacity is added to the capacity for which duplication elimination can be carried out. The second capacity is the LU size 306 of GI 1710 corresponding to the GI LU ID 702 except LU ID 702 of GI which was found firstly.

Then in the step 2806, the GI management program 200 selects which of duplication elimination of the first type and duplication elimination of the second type is to be performed. In concrete terms, the following processes are performed:

(1) The GI management program 200 calculates the capacity that can be eliminated by duplication elimination of the second type (i.e. the capacity for which deletion of the second type can be performed). This capacity of the second type that can be deleted may be calculated by subtracting (Y) described below from (X) described below.

(X) If the patch is applicable to the copied target GI, the total capacity that can be deleted of all of the VMs 1701 corresponding to the target combination 700;

(Y) the capacity of the target GI.

(X) described above is the total size of the patches, among the patches of all the VMs corresponding to the target combination, for which "Diff" is registered in the VM patch management table 203. The sizes of the patches may be acquired from the patch management table 205.

(Y) described above is the capacity specified by the LU size 305 corresponding to the target GI and to the same LU ID 300. Here, in the case of duplication elimination of the second type, a patch that is not applied to the target GI, among the patches that make up the target combination, is applied to the copied target GI in the step 2602 (refer to FIG. 26).

(2) The GI management program 200 calculates the capacity that can be eliminated by duplication elimination of the first type (i.e. the capacity for which deletion of the first type can be performed). This capacity for which deletion of the first type can be performed is capacity that can be deleted when the target GI is used. This capacity that can be deleted is the total size of the patches that are VM patches corresponding to the target combination and moreover for which, among patches that duplicate a combination 700 of patches corresponding to the target GI, "Diff" is registered in the VM patch management table 203.

(3) Among capacity for which deletion of the first type can be performed and capacity for which deletion of the second type can be performed, the GI management program 200 selects the type of duplication elimination that corresponds to the greatest capacity that can be deleted.

After the step 2806, the step 2807 is performed. At this time, the capacity that can be deleted corresponding to the type of duplication elimination selected in the step 2806 is the capacity upon which duplication elimination can be performed.

If all of the confirmation flags 703 are "1", then the result of the decision in the step 2801 is negative (NO in the step 2801). In this case, as previously described, the GI management program 200 executes the step 2810.

In this step 2810, the GI management program 200 determines a GI 1710 which is not a source of acquisition of any of the snapshots 1708, as a GI 1710 to be deleted. And the GI management program 200 specifies, from the LU VM management table 202, a GI LU ID 304 for which the LU ID 300 and the GI LU ID 304 are the same. An LU for which the LU ID 300 and the GI LU ID 304 are the same is a GI that is not the LU of a snapshot 1708 (in the subsequent explanation of the step 2810, this will be termed a "GI taken note of"). Then the GI management program 200 makes a decision as to whether or not an ID in which the specified LU ID 304 is specified is registered as a GI LU ID 801, a GI LU ID 811, and a copy source 812. The result of this decision being negative means that the GI taken note of is not a GI that is the source of acquisition of any snapshot 1708. In this case, the GI management program 200 determines the ID in which this GI taken note of LU ID 304 is specified as being a GI LU ID that can be deleted.

The processing shown in FIG. 28 as "processing to determine the subject for duplication elimination" is processing that can be applied to a case in which a patch 1705 is applied to a guest OS 1702 corresponding to a GI 1710, and/or to a case in which a patch 1705 is applied to a guest OS 1702 corresponding to a snapshot 1708. And, as another example of application, the processing shown in FIG. 28 as "processing to determine the subject for duplication elimination" may also be considered as applied to processing that considers deletion (uninstallation) of a patch that has been applied. For example, it may be supposed that the snapshots #1 through #3 are snapshots of GIs to which no patches are applied. And let it be supposed that a patch A and a patch B are applied to the guest OS #1 of the snapshot #1, the patch A and the patch B are applied to the guest OS #2 of the snapshot #2, and the patch A is applied to the guest OS #3 of the snapshot #3. In the first patch application processing, the agent program applies the patch A and the patch B to the guest OS corresponding to the GI. And in the VM re provisioning processing, the snapshots #1 through #3 are specified. Then in the second patch application processing the patch B is deleted from the guest OS #3 corresponding to the snapshot #3. By doing this, it is possible to reduce the number of added patches, so that it is possible to reduce the amount of storage capacity that is consumed.

While in the above the "processing to determine the subject for duplication elimination" has been shown, it would also be acceptable for any type of algorithm to be used as the algorithm for determining the patch that is to be the subject for duplication elimination, provided that this algorithm is capable of reducing the consumed storage capacity of the storage device. For example, it would also be acceptable for an algorithm that takes into consideration the sequence of application of the patches to be utilized.

Figure 29:
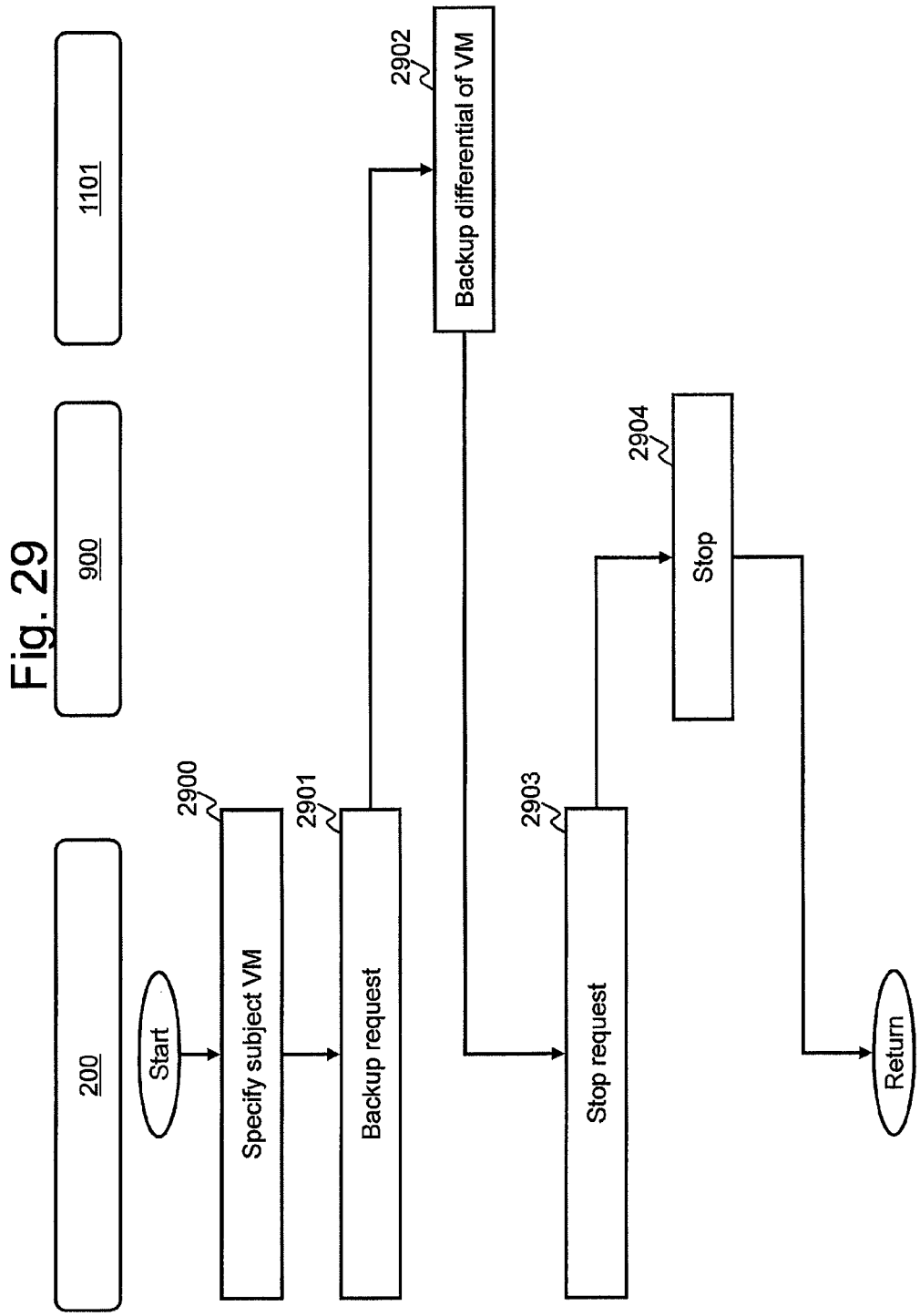
FIG. 29 shows a flow chart for VM stoppage processing.

FIG. 29 shows a flow chart for VM stoppage processing.

This VM stoppage processing is executed after the processing of the step 2810 has ended.

In a step 2900, the GI management program 200 specifies the VM ID 800 of the first processing management table 207a as the ID of the VM that is to be the subject for duplication elimination.

Then in a step 2901, the GI management program 200 transmits a request to backup differential data to the agent program 1101 of the VM 1701 that is identified from the ID specified in the step 2900.

In the step 2902, the following processing is performed.

(1) At the initial start of the VM 1701, the agent program 1101 specifies from the VM management program 900 the VM ID 1000 corresponding to the VM upon which this agent program 1101 is executed, the registry ID 1001, and the destination for storage 1002. In order to delete the differential data of a snapshot corresponding to the VM ID 1000, it is necessary to back up the registry of the guest OS 1702 (i.e. the individual registry 1104), that was individually set up, from the guest OS 1702.

(2) The agent program 1101 creates an individual registry from the initial registry, the current registry, and the differential data.

(3) The agent program 1101 registers the file name of this individual registry 1104 that has been created as a registry ID 1001, and stores this file in the location (i.e. in the directory) specified by the destination for storage 1002.

Then in a step 2903, the GI management program 200 transmits a request to the VM management program 900, to stop the VM 1701 corresponding to the VM ID 800.

Then in a step 2904, the VM management program 900 stops the VM 1701 specified by the stop request. This stoppage processing need not be performed for a VM 1701 that is already stopped.

Figure 30:
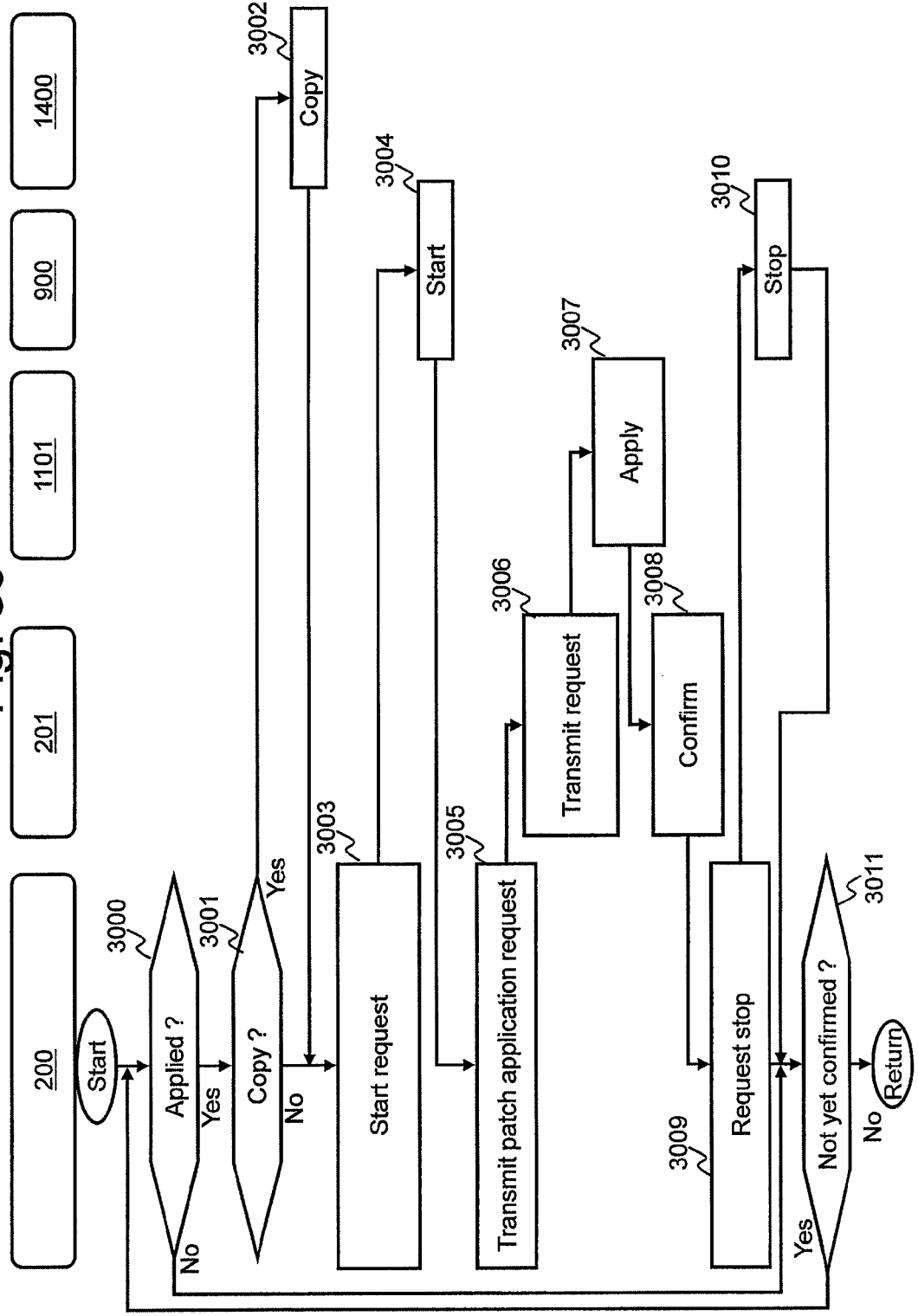
FIG. 30 shows a flow chart for first patch application processing.

FIG. 30 shows a flow chart for the first patch application processing. This processing is processing for applying a patch to the GI 1710.

This first patch application processing is executed in order of registration in the second processing management table 207b. In the explanation of FIG. 30, the single GI that becomes the subject for the first patch application processing is termed the "target GI #2".

First in a step 3000, the GI management program 200 refers to the second processing management table 207b, and makes a decision, by whether or not the ID specified by the patch ID 600 is registered as an added patch 813, as to whether or not that patch is applied to the VM 1701 corresponding to the target GI #2. If the result of this decision is affirmative (YES in the step 3000), then the GI management program 200 executes a step 3001, whereas if the result of this decision is negative (NO in the step 3000), then it executes a step 3011.

In the step 3001, the GI management program 200 makes a decision as to whether or not to copy the target GI #2. In concrete terms, for example, the GI management program 200 specifies a GI LU ID 811 and a copy source 812 in the second processing management table 207b. If the ID of the target GI #2 is registered as a copy source, then the GI management program 200 reaches the decision that copying should be performed. At this time, the GI LU ID 811 corresponding to this copy source 812 is the LU that is the copy destination. If there are a plurality of the same corresponding copy source 812 and the same GI LU ID 811, then one copy is created. However, if the GI LU IDs 811 are different even though the copy source is the same, then a plurality of copies are created. And if the ID of the target GI #2 is not registered as a copy source 812, then the GI management program 200 reaches the decision that copying should not be performed.

If it has been decided to perform copying (YES in the step 3001), then the GI management program 200 transmits to the storage device management program 1400 a copy request in which a LU ID of a copy source (for example "LUN") and a LU ID of a copy destination (for example "LUN") are designated.

But if it has been decided not to perform copying (NO in the step 3001), then the GI management program 200 executes a step 3003.

In a step 3002, the storage device management program 1400 creates a LU corresponding to the LU ID of the copy destination, and copies data to this LU from the LU corresponding to the LU ID of the copy source. At this time, the storage management program 1400 could also use a snapshot that is a logical copy.

In the step 3003, the GI management program 200 specifies from the LU VM management table 202 the VM ID 301 corresponding to the same LU ID 300 as the target GI #2. Next, the GI management program 200 transmits to the VM management program 900 a start request in which the LU ID of the target GI #2 is designated (i.e. a request to start a VM identified from the VM ID that has been acquired). In the explanation of FIG. 30, this VM for which a start request is issued will be termed the "target VM #2". If a copy source 812 is registered that corresponds to this target VM #2, then the GI management program 200 also transmits to the VM management program 900 the IP address set after the target VM #2 has been started.

Then in a step 3004 the VM management program 900 mounts the LU of the target GI #2 corresponding to the LU ID designated by the start request that has been received, and starts the target VM #2. And, when an IP address is also received, the VM management program 900 sets this IP address for the started target VM #2.

Then in a step 3005, the GI management program 200 specifies the patch designated by the added patch 813 corresponding to the VM ID 810 of the target VM #2 (in the explanation of FIG. 30, this is termed the "subject patch"), and transmits to the patch update management program 201 a request to apply this subject patch to the target VM #2.

Then in a step 3006, the patch update management program 201 transmits a request to the agent program 1101 to download the subject patch and to apply the subject patch to the guest OS 1702.

Then in a step 3007, upon receipt of the request of the step 3006, the agent program 1101 downloads the subject patch from the patch update management program 201, and applies this subject patch to the guest OS 1702. In other words, the data of this subject patch that has been applied is stored in the target GI #2.

Then in a step 3008, the patch update management program 201 registers "GI" for the subject patches (the patches A through D) corresponding to the VM ID 400 of the target GI #2 in the management table 203.

Then in a step 3009, the GI management program 200 transmits a stop request for the subject VM #2 to the VM management program 900.

In a step 3010, upon receipt of the stop request of the step 3009, the VM management program 900 stops the target VM #2.

And in a step 3011, the GI management program 200 makes a decision as to whether or not there is a VM ID 810 corresponding to a not yet confirmed GI. If the result of this decision in the step 301 is affirmative (YES in the step 3011), then the GI management program 200 executes the step 3000. But if the result of this decision in the step 301 is negative (NO in the step 3011), then the GI management program 200 executes the step 3100.

FIG. 31 shows a flow chart for VM re provisioning processing.

In a step 3100, the GI management program 200 specifies all of the GI LU IDs 801, and transmits to the storage device management program 1400 a request to create a snapshot of the GI. It will be supposed, for example, that the LU ID of the snapshot that is created (for example "LUN") becomes the VM ID 800 corresponding to the GI LU ID 801.

Then in a step 3101 the storage device management program 1400 deletes from the storage pool 1709 the differential data of the LU corresponding to the LU ID of the requested snapshot, and of the snapshot.

Then in a step 3102 the storage device management program 1400 selects a GI and creates a snapshot, so that the requested LU ID of the snapshot and the GI LU ID correspond.

Then in a step 3103 the GI management program 200 makes a decision as to whether or not the GI determined for deletion in the step 2810 exists.

If it has been determined that the GI to be deleted exists (YES in the step 3103), then the GI management program 200 transmits the GI LU ID to be deleted to the storage device management program 1400. But if it has been determined that the GI to be deleted does not exist (NO in the step 3103), then the GI management program 200 executes a step 3105.

Thus, in a step 3104, the storage device management program 1400 deletes the LU corresponding to the LU ID for which the delete request was issued.

But in the step 3105 the GI management program 200 specifies a VM ID 800 that is registered in the first processing management table 207a. And the GI management program 200 transmits to the VM management program 900 a start request in which the LU ID of this VM is designated (i.e. a start request for the VM corresponding to the VM ID that has been acquired). The LU ID of the VM is the LU ID 300 corresponding to the same VM ID 301 as the VM ID that has been acquired. In the explanation of FIGS. 31 and 32, the VM for which the start request is issued is termed the "target VM #3".

Finally, in a step 3106, the VM management program 900 mounts the LU of the target VM #3 corresponding to the LU ID that has been received, and starts the target VM #3.

FIG. 32 shows a flow chart for the second patch application processing. This processing is processing for applying a patch to the snapshot 1708.

In a step 3200, the GI management program 200 makes a decision as to whether or not to apply the patch to the target VM #3. In concrete terms, the GI management program 200 makes a decision as to whether or not the patch ID corresponding to the VM ID 800 in the first processing management table 207a is registered as an added patch 802.

If it has been decided to apply the patch (YES in the step 3200), then the GI management program 200 performs the processing of the step 3201.

But if it has been decided not to apply the patch (NO in the step 3200), then the GI management program 200 terminates this duplication elimination processing.

In the step 3201, the GI management program 200 specifies the added patch 802 being registered and the VM ID 800 corresponding to this added patch (hereinafter, in this explanation of FIG. 32, termed the "subject added patch"). And the GI management program 200 transmits the specified information to the patch update management program 201.

Then in a step 3202 the patch update management program 201 transmits to the agent program 1101 a request to download the subject added patch and to apply the subject added patch to the guest OS 1702.

Next, in a step 3203, the agent program 1101 downloads the subject added patch from the patch update management program 201, and applies this subject added patch to the guest OS 1702.

Then in a step 3204 the patch update management program 201 registers "Diff" for the subject added patch (patches A through D) corresponding to the VM ID 400 of the target VM #3 in the VM patch management table 203.

And next, in a step 3205, the GI management program 200 transmits a restoration request for the differential data to the agent program 1101 corresponding to the target VM #3.

In the next step 3206, the agent program 1101 acquires, from the position designated by the destination for storage 1002 corresponding to the VM 1701 that is operating, the individual registry 1104 whose file name is set in the registry ID 1001. The agent program 1101 overwrites this individual registry 1104 that has been acquired to the registry 1102.

Finally in a step 3207 the GI management program 200 receives a differential data restoration response from the agent program 1101, and then the duplication elimination processing terminates.

The above completes the explanation of the first embodiment.

It should be understood that, in this first embodiment, it would also be acceptable to arrange for the GI management program 200, while the VM 1701 is stopped during the duplication elimination processing, to output a request to the storage device management program 1400 to make the port used for access invalid, so as not to access the LU corresponding to the VM 1701 which is stopped. The storage device management program 1400 will then make the port invalid according to this request. In particular it would also be acceptable, during periods other than the period from the step 3004 to the step 3010, to set the LU that is the GI 1710 to read only, in order for data not to be written, even if erroneous operation should occur.

Furthermore it would also be possible to perform duplication elimination of the same patch applied to a plurality of VMs with the logical structure of FIG. 3 as well, by backing up both the user data and the application data in the step 2902, and by restoring the backed up user data and application data in the step S3206. Restoration of the application data may be implemented by managing data for re installing the application installed on the VM, and managing which VM the application is installed on. And it is also possible to make re installation of the application unnecessary, by streaming distribution of the application.

It would also be acceptable to arrange for the storage device management program 1400, in the step 3002, to create the LU that is to become the GI 1710 from a RAID group built up from the SSDs 121. It may be expected that, due to this, the access performance to this GI 1710 will be enhanced, since its access will be centralized. At this time, the storage device management program 1400 may manage the assortment of drives constituting the LU, so as to use the LU built up from the SSDs 121, as the GI 1710. The LU that constitutes the storage pool in which the differential data (i.e. the patch data) of the snapshots 1708 is stored may be an LU based upon the HDDs 122, rather than upon the SSDs 121.

If it would improve the vulnerability of the relationship of the patch that is scheduled to be used to the specified port, then it would also be acceptable to arrange for the agent program 1101 not to download any patch in the step 3203, but rather to set the port to unusable. By doing this, it may be anticipated that the advantageous effects will be obtained of prevention of erroneous operation of the computer 102 due to malfunctioning of the patch itself, and also of making it unnecessary to increase the amount of differential data due to application of the patch. At this time, the patch update management program 201 may manage the ports so that the patch corresponding to the patch ID 600 is improved.

It would also be possible to arrange for the GI management program 200 to display the capacity for which duplication elimination can be performed and that is the subject of comparison in the step 2807 with a GUI (not shown in the figures). By doing this, it would be possible for the manager to know to what extent it is possible to implement increase of the efficiency of capacity utilization. At this time, it would also be acceptable for a value obtained by subtracting the patch capacity generated by the second patch application processing from the patch capacity deleted in the step 3101, to be displayed as the amount of consumed storage capacity that can be reduced.

According to this first embodiment, by applying a plurality of patches that are differential data for snapshots to the GI 1710, it is possible to delete from the storage pool a plurality of patches that are the same and that are applied to a plurality of VMs 1701. By doing this, it is possible to reduce the consumption of storage capacity.

Moreover since, according to the first embodiment, the patches are applied to the GIs that are the sources for acquisition of the snapshots, accordingly it is possible to eliminate decrease of the duplication elimination ratio when employing management by pages, i.e. in which the storage region is considered as being divided up into units of pages, so that the advantageous effect is obtained that it is possible to improve the efficiency at which capacity is utilized.

It should be understood that it would be possible to build the storage region of the storage device from a plurality of sub storage regions. These sub storage regions may, for example, be storage regions (hereinafter termed "pages") of a small fixed size, smaller than the size of the LUs (i.e. of the logical volumes). These pages may be of larger size than the blocks. The differential data of the snapshots (i.e. the data written in the snapshots) may be managed by units of pages. A method of duplication elimination may also be considered in which it is arranged, if several copies of the same page are present, only to refer to a single one of these pages, and to delete the data within the other pages. However, if this method is employed, then there is a danger that it will not be possible to perform duplication elimination, because the sizes of the patches and the sizes of the pages may be different, and/or because the patch storage positions in the pages (i.e. the positions within the pages at which the patches are stored) may be different.

However since, according to the first embodiment, the patch is applied to GIs that are sources for acquiring snapshots, accordingly it is possible to reduce the consumption of storage capacity, even when page management is employed.

Moreover, it would also be possible to employ the duplication elimination according to the first embodiment and duplication elimination by units of pages, together in parallel with one another. By employing these two types of duplication elimination together in parallel, yet further benefits of duplication elimination may be anticipated. With such a system in which these two types of duplication elimination are employed together in parallel, the IDs of patches that have been deleted by performing duplication elimination by units of pages should be registered in the VM patch management table.

Furthermore instead of, or in addition to, being applied to patches for an OS, the present invention can be applied to at least one of patches to an application and to applications themselves. For example since, by applying the present invention to patches to OSs, often an OS can be used in common between a plurality of VMs, it may be anticipated that the number of patches that can be reduced will be rather large.

EXAMPLE 2

An integrated type device in which a computer, a storage device, and a coupling device are assembled together in advance is known. Here "integrated type device" means a device that has a computer, a storage device, and a coupling device for which connectivity is ensured in advance. Provided that this computer, storage device, and coupling device are treated all together as a single unit, it would be acceptable to house them all together within one casing, or alternatively to disperse them between a plurality of casings. In concrete terms, for example, it can be considered that the computer, the storage device, and the coupling device may be treated as being physically unified.

In this second embodiment, increase of the efficiency of capacity utilization of a large scale computer system that is set up in a virtualized environment using integrated type devices will be explained. Portions of the explanation that are common with the first embodiment are abbreviated or omitted.

Values are used for the LU IDs 300, the VM IDs 301, the VM IP addresses 303, the patch IDs 600, the registry IDs 1001, and the destinations for storage 1002 that can be uniquely identified by the computer system 3304.

In this second embodiment, a GI management program 3401 executes duplication elimination processing while giving priority to dispersal of empty capacity between a number of integrated type devices 3301. The manager can change priority items by using a GUI (not shown in the figures) of the GI management program 3401. Such priority items include items of a plurality of types, for example, dispersal of vacant capacity, dispersal of I/O load, dispersal of CPU load, and dispersal of SNF VP load.

Figure 33:
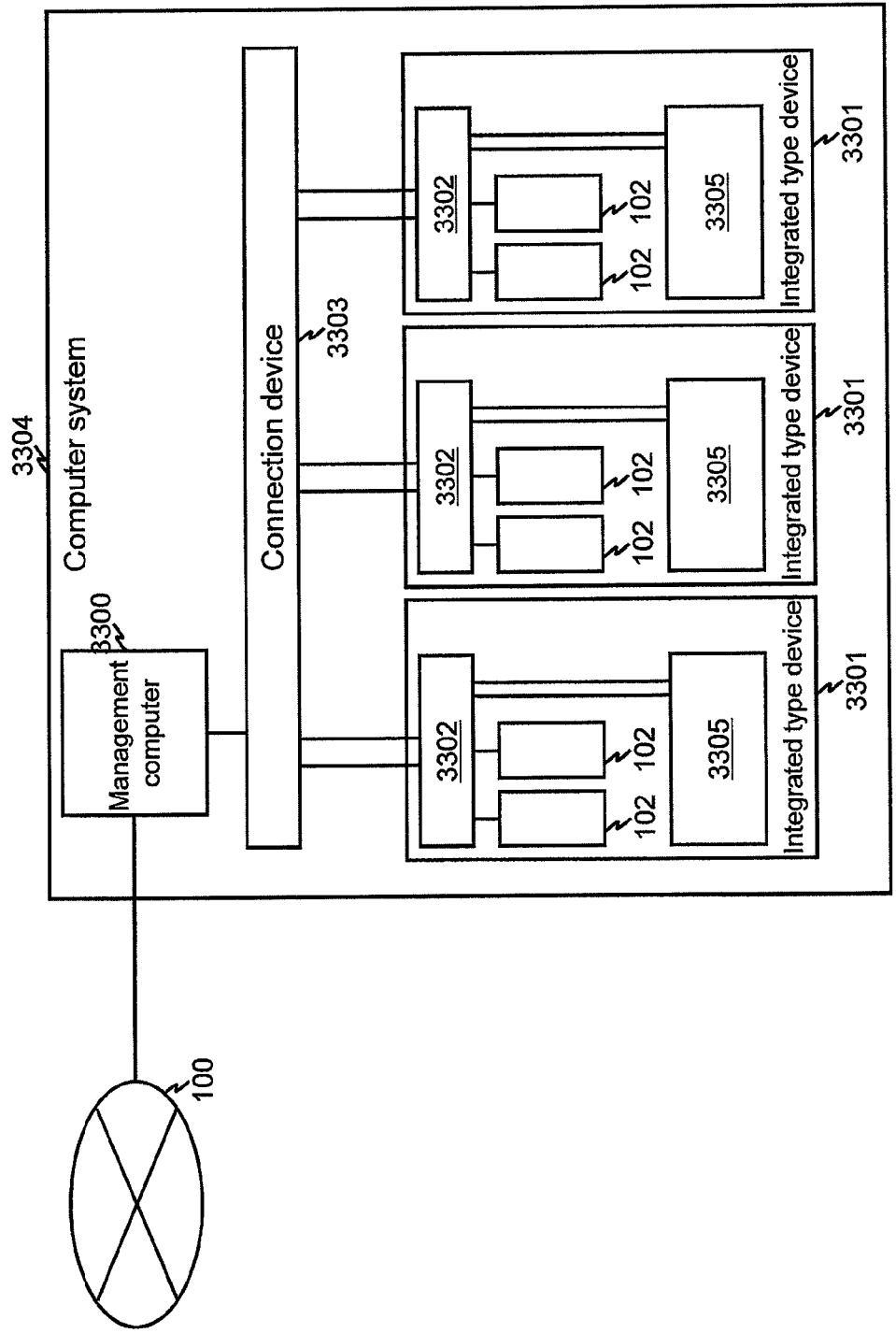
FIG. 33 shows the structure of a computer system according to a second embodiment of the present invention.

FIG. 33 shows the structure of a computer system according to this second embodiment of the present invention.

The computer system 3304 comprises a management computer 3300, integrated type devices 3301, and a coupling device 3303.

The management computer 3300 manages VMs 1701 and patches 1705 that are applied to the VMs 1701, the computers 102, and the storage devices 3305.

The integrated type devices 3301 comprise coupling devices 3302, computers 102, and storage devices 3305.

The coupling devices 3302 couple together the computers 102 and the storage devices 103, and relay communications between the computers 102 and the storage devices 103.

And the coupling device 3303 couples together the management computer 3300 and the coupling devices 3302 of the integrated type devices 3301, and relays communications between the management computer 3300 and the integrated type devices 3301 and between each of the integrated type devices 3301 and the others.

The coupling between these various devices may be established, for example, via Ethernet.

Figure 34:
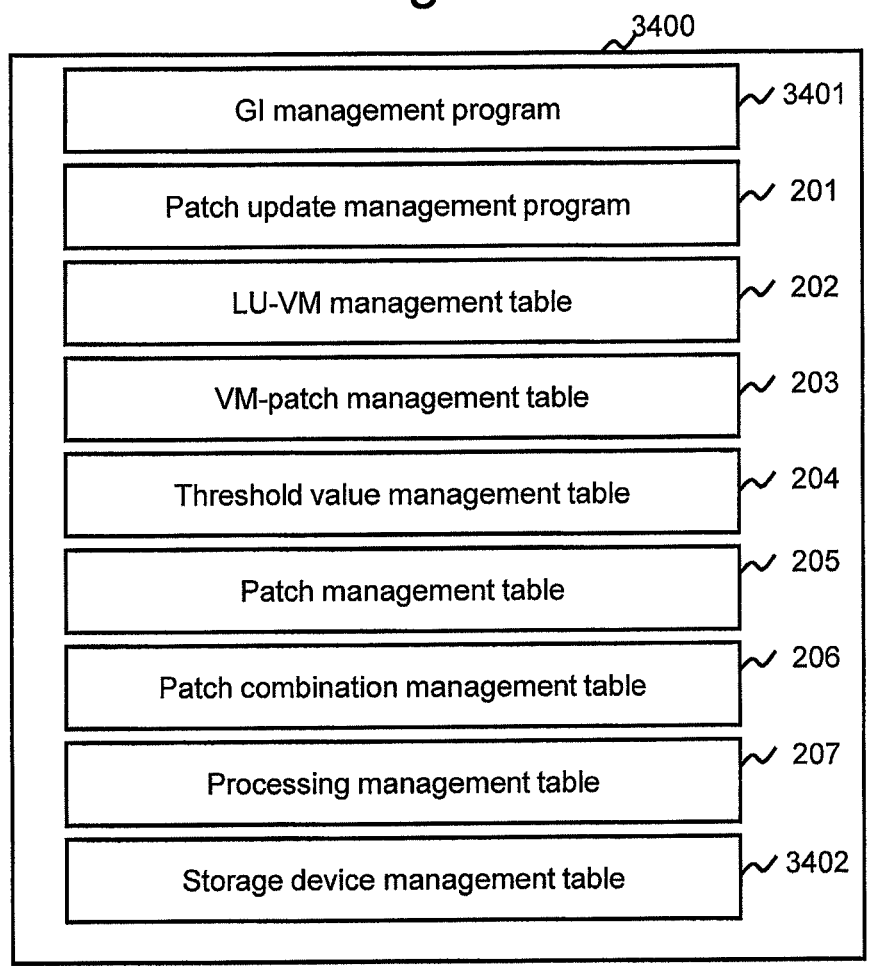
FIG. 34 shows information and computer programs stored in a memory 3400 of a management computer 3300.

FIG. 34 shows information and computer programs stored in a memory 3400 of the management computer 3300.

In addition to the various programs and tables that were stored in the memory 109 of the first embodiment, the memory 3400 of the management computer 3300 also stores a storage device management table 3402. This storage device management table 3402 holds information related to the storage devices 3305.

FIG. 35 shows the structure of this storage device management table 3402.

This storage device management table 3402 may for example hold, for each of the storage devices 3305, the following information: a storage device ID 3500, a vacant capacity 3501, an I/O load 3502, a CPU usage ratio 3503, and an SNF I/F usage ratio 3504. In the following, these various types of information will be explained by taking as an example a single one of the storage devices 3305 (in the explanation of FIG. 35, this will be termed the "subject storage device").

The storage device ID 3500 is the ID of the subject storage device 3305.

The vacant capacity 3501 is the vacant capacity of the subject storage device 3305.

The I/O load 3502 is the number of I/O operations that can be processed during one second by the subject storage device 3305.

The CPU usage ratio 3503 is the usage ratio of the CPU of the subject storage device 3305.

The SNF I/F usage ratio 3504 is the usage ratio of a SNF I/F (for example a LAN port) within the subject storage device 3305, that is used when writing data to the subject storage device 3305 or when reading data from the subject storage device 3305.

Figure 36:
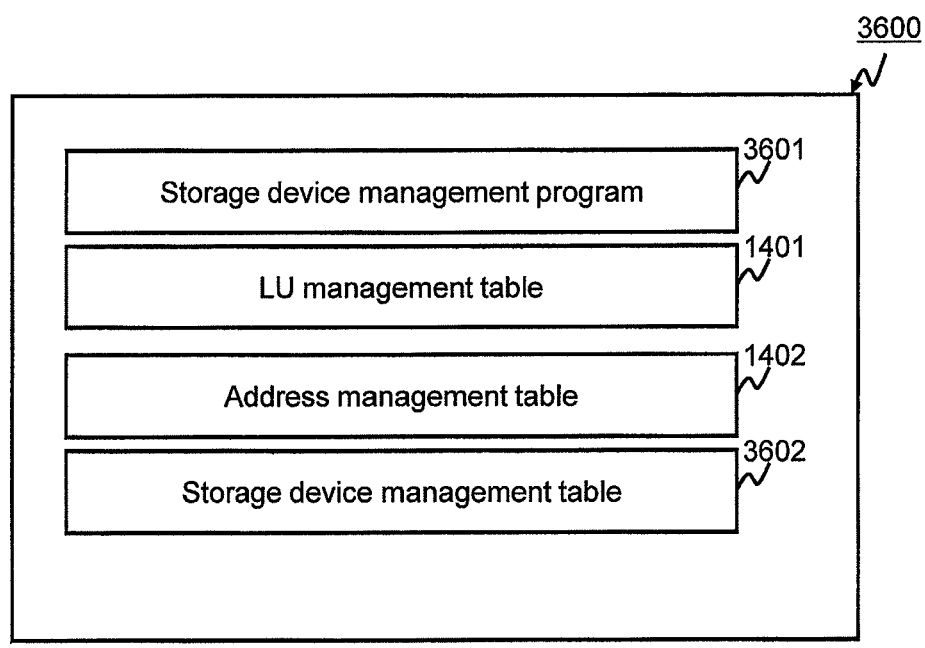
FIG. 36 shows information and a computer program stored in a memory 3600 of a storage device 3305.

FIG. 36 shows information and a computer program stored in a memory 3600 of one of the storage devices 3305.

In addition to the programs and the tables stored in the memory 116 of the first embodiment, this memory 3600 of the storage device 3305 stores a storage device management table 3602.

In addition to the processing performed in the first embodiment, a storage device management program 3601 periodically registers the vacant capacity 3701, the I/O load 3702, the CPU usage ratio 3703, and the SNF I/F load 3704 in the storage device management table 3602.

The storage device management table 3602 holds information related to the storage device 3305 that maintains this table 3602.

Figure 37:
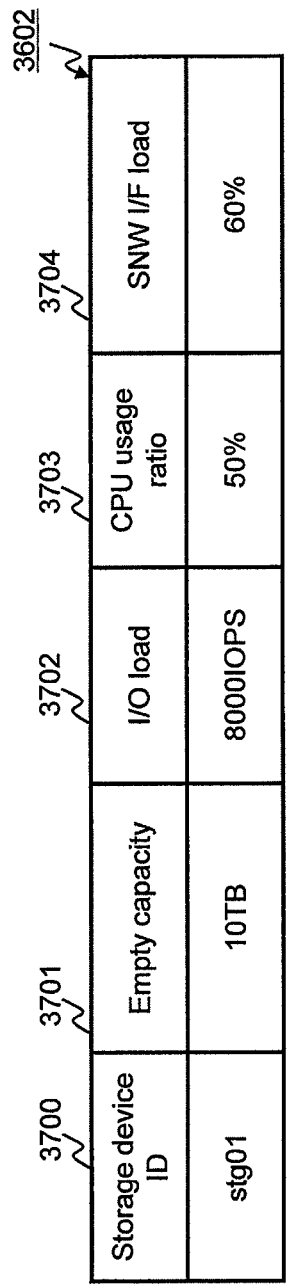
FIG. 37 shows the structure of a storage device management table 3602.

FIG. 37 shows the structure of the storage device management table 3602.

The storage device management table 3602 holds storage device ID 3700, vacant capacity 3701, I/0 load 3702, CPU usage ratio 3703, and SNF I/F usage ratio 3704. These items of information 3700 through 3704 are the same as the information items 3500 through 3504 explained with reference to FIG. 35.

Figure 38:
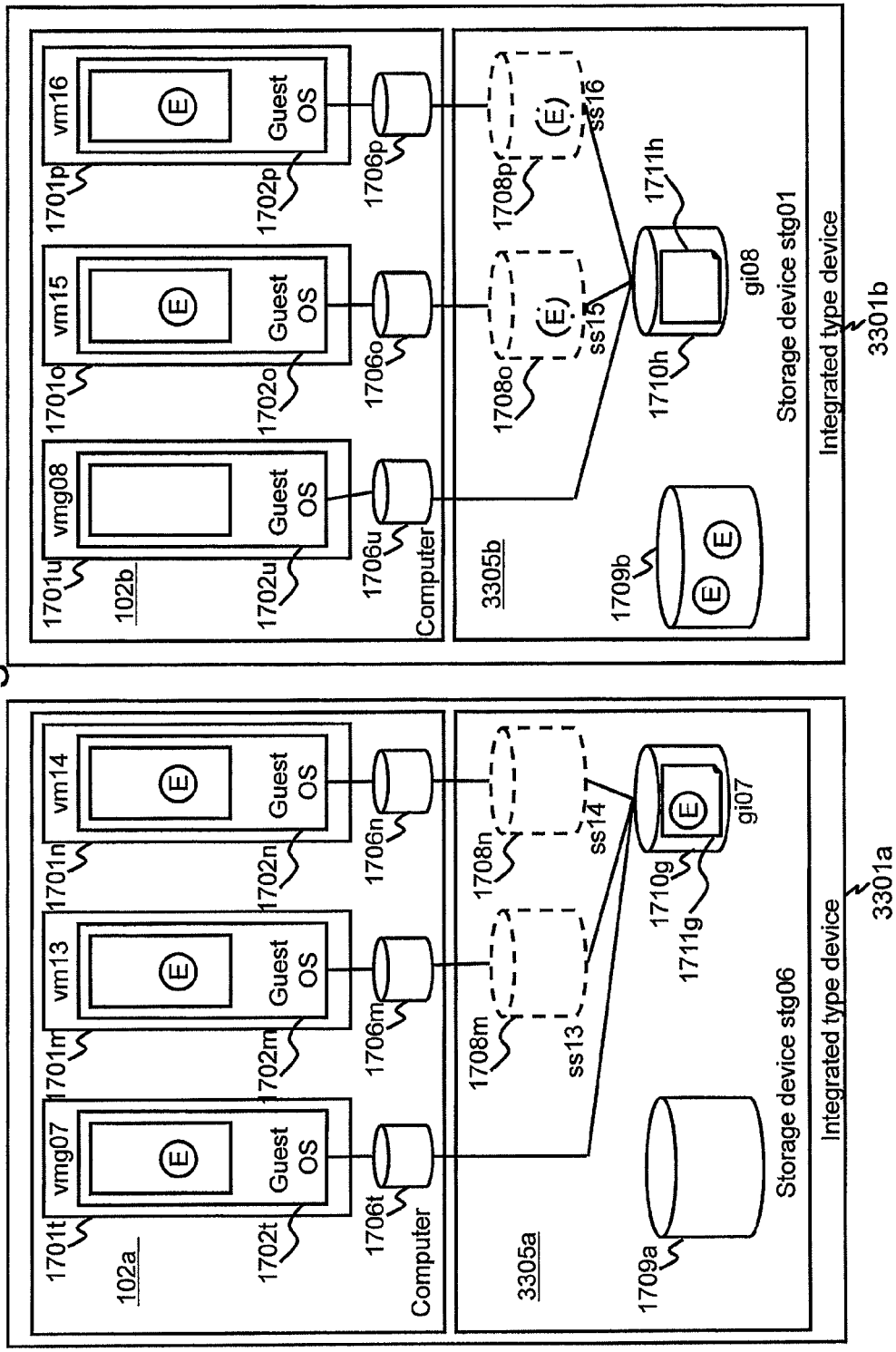
FIG. 38 shows an example of logical structure, for a case in which a patch is applied to a plurality of VMs.

FIG. 38 shows an example of logical structure, for a case in which a patch is applied to a plurality of VMs.

Integrated type devices 3301a and 3301b are present. The integrated type device 3301a comprises a computer 102a and a storage device 3305a, while the integrated type device 3301b comprises a computer 102b and a storage device 3305b.

In the integrated type device 3301a, there is a GI 1710g that has a storage pool 1709a and a virtual disk file 1711g. And there are guest OSs 1702t, 1702m, and 1702n that are executed by VMs 1701t, 1701m, and 1701n. Moreover, there are snapshots 1708m and 1708n of the GI 1710g. An LU 1706t is available due to the mounting of the GI 1710g. And LUs 1706m and 1706n are available due to mounting of the snapshots 1708m and 1708n. A patch E is applied to the guest OSs 1702t, 1702m, and 1702n. Since the patch E is applied to the master guest OS 1702t, the patch E is applied to the virtual disk file 1711g.

In the integrated type device 3301b, there is a GI 1710h that has a storage pool 1709b and a virtual disk file 1711h. And there are guest OSs 1702u, 1702o, and 1702p that are executed by VMs 1701u, 1701o, and 1701p. Moreover, there are snapshots 1708o and 1708p of the GI 1710h. An LU 1706u is available due to the mounting of the GI 1710h. And LUs 1706o and 1706p are available due to mounting of the snapshots 1708o and 1708p. The patch E is applied to the guest OSs 1702o and 1702p. Due to this, the patch E is stored in the snapshots 1708o and 1708p, and as a result two copies of the patch E are stored in the storage pool 1709b.

Figure 39:
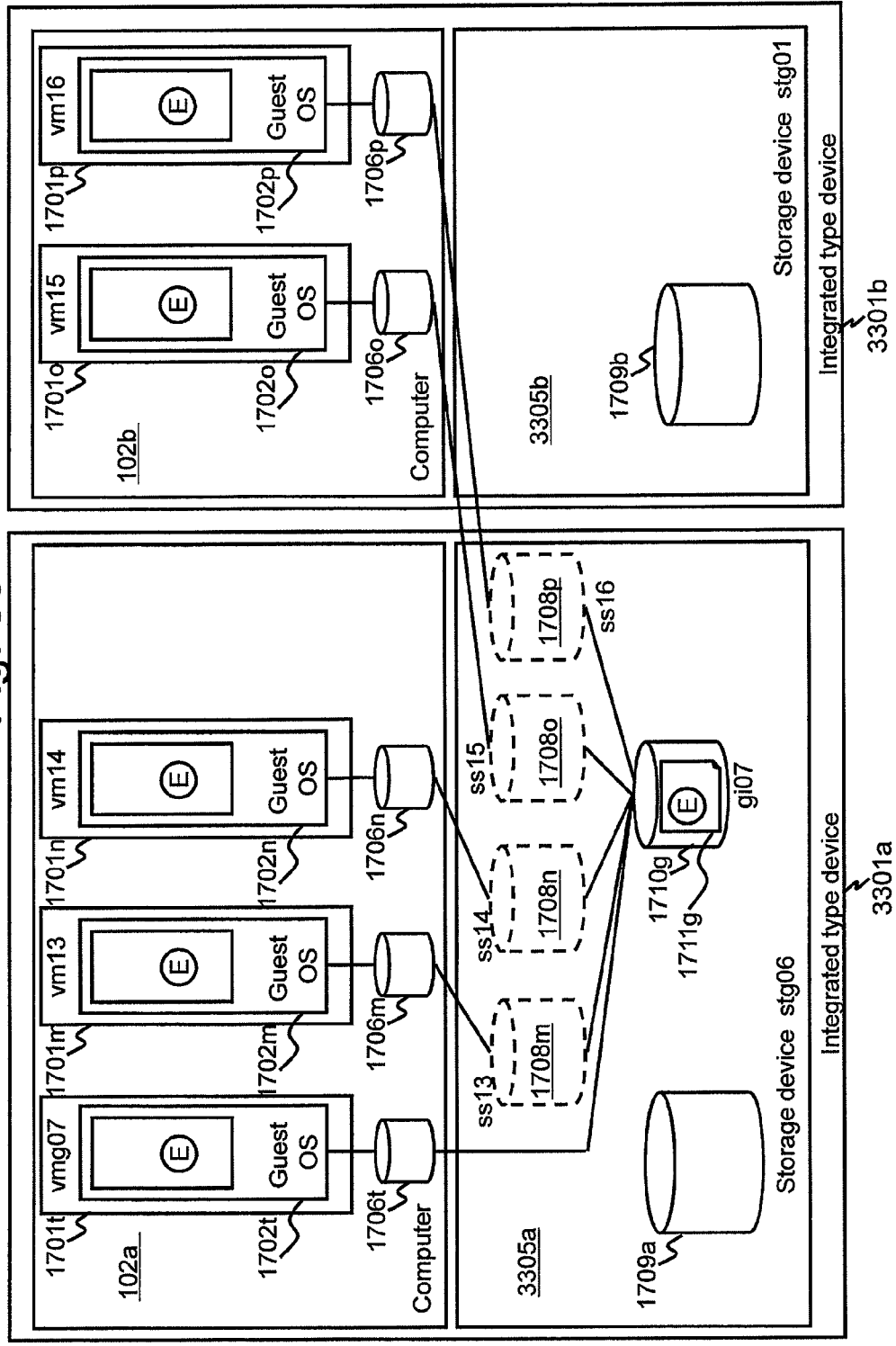
FIG. 39 shows a logical structure after duplication elimination has been performed upon the logical structure shown in FIG. 38.

FIG. 39 shows the logical structure after duplication elimination has been performed upon the logical structure shown in FIG. 38.

When duplication elimination of the fourth type has been performed upon the entire system shown in FIG. 38 that includes the integrated type devices 3301a and 3301b, the logical structure shown in FIG. 39 results.

In concrete terms, duplication elimination of the first type is performed upon the integrated type device 3301b. Due to this, the patch E is stored in the GI 1710h, and the two copies of the patch E are deleted from the storage pool 1709b.

Thereafter, duplication elimination of the third type is performed upon the entire system that includes the integrated type devices 3301a and 3301b. Due to this, among the GIs 1710g and 1710h that are the same, the GI 1710h is deleted, and moreover the snapshots 1708o and 1708p of the GI 1710h are made into snapshots of the GI 1710g.

In this manner, in this second embodiment, it is possible to perform duplication elimination of any of the first type through the fourth type, both for a single integrated type device and for an overall system that includes a plurality of integrated type devices.

Figure 40:
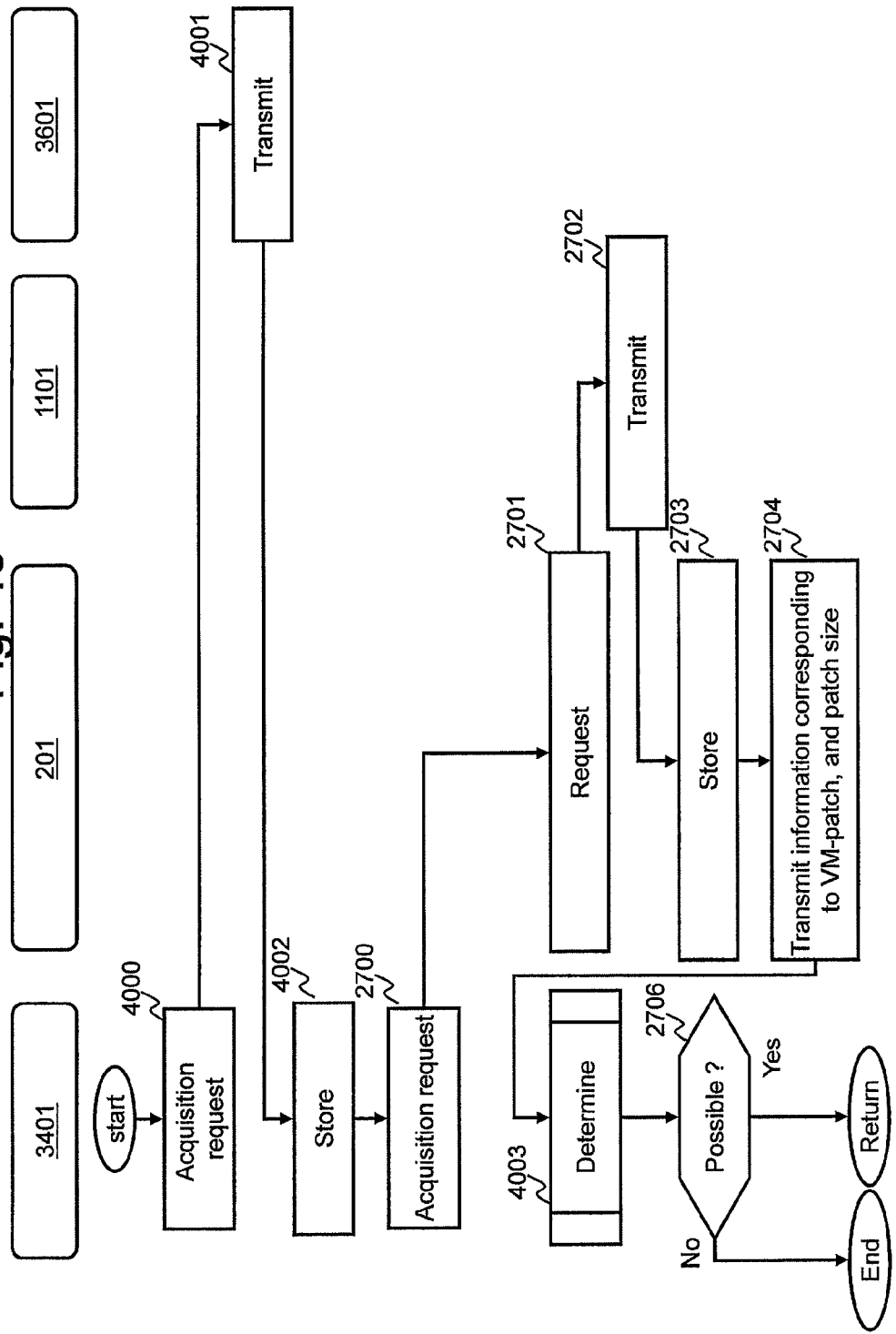
FIG. 40 shows a flow chart for patch application monitoring processing according to this second embodiment.

FIG. 40 shows a flow chart for patch application monitoring processing according to this second embodiment.

In this patch application monitoring processing according to the second embodiment, steps 4000 through 4002 are added to the patch application monitoring processing according to the first embodiment.

In the step 4000, the GI management program 3401 transmits a request to the storage device management program 3601 that is operating upon each of the storage devices 3305 to acquire information held in the storage device management tables 3602.

Then in the step 4001 the storage device management programs 3601 acquire the information held in the storage device management tables 3602, and transmits this information to the GI management program 3401.

Then in the step 4002 the GI management program 3401 registers the information that it has received (i.e. the information held in the storage device management tables 3602) in the storage device management table 3402. It should be understood that, if the same storage device ID 3500 as the storage device ID of some item of information that has been received is already registered in the storage device management table 3402, then the GI management program 3401 updates the information corresponding to this storage device ID.

The "processing to determine the subject for duplication elimination" of the step 4003 is different from the "processing to determine the subject for duplication elimination" (in the step 2705) of the first embodiment.

FIG. 41 shows the flow chart for this processing for determining the subject for duplication elimination, according to this second embodiment. In FIG. 41, the steps that are different from processing steps of FIG. 28 are denoted by reference symbols that are different from those in FIG. 28.

In the step 4100, the GI management program 3401 selects the GI denoted by the ID 702 that corresponds to the target combination as the GI to be used for processing for duplication elimination of the target combination. And, if a plurality of GIs are registered, then the GI management program 3401 selects the IG that is stored in the storage device 3305 whose vacant capacity is the greatest. In the explanation of FIG. 41, the selected GI is termed the "target GI #3".

And in the step 4101 the GI management program 3401 decides, for the patch combinations 700 that are smaller in size than the target combination, whether or not, in the patch combination management table 206, there are GI LU IDs 702 corresponding to these patch combinations 700, in descending order of size. In this decision, only patch combinations 700 including the target combination patch are taken as subjects for decision, and the GI management program 3401 selects the GI 1710 corresponding to the GI LU ID 702 that was initially found as the target GI #3. And, if a plurality of GIs are registered to the patch combination 700, then the GI management program 3401 selects that GI that is stored in the storage device 3305 that has the greatest vacant capacity. If no such GI LU ID 702 is found, then the GI management program 3401 selects a GI 1710 corresponding to a GI LU ID 702 to which not even one patch is applied as the target GI #3.

While the storage device 3305 that has the greatest vacant capacity is preferentially selected in the step 4100 or 4101, instead of this, it would also be acceptable for a storage device 3305 to be selected on the basis of I/O load, CPU usage ratio, or SNF I/F load, in correspondence to an item for priority that is set in advance. At this time, the GI management program may select as the "target GI #3" the GI that is in the storage device 3305 having the minimum value of the priority item (in other words, that is in that storage device for which the I/O load, the CPU usage ratio, or the SNF I/F load is the smallest).

If there are a plurality of CPUs for a storage device 3305, then it would be acceptable to use the average value of the CPU usage ratios of the plurality of CPUs, or to use the CPU usage ratio of one specified CPU. If the CPU usage ratio of one specified CPU is used, then the GI that is accessed by that specified CPU is selected as the target GI #3. The same is done for the other priority items.

The above completes the explanation of the second embodiment.

According to this second embodiment, it is possible to reduce the consumption of storage capacity by performing duplication elimination for the same patches applied to VMs 1701 of the plurality of integrated type devices 3301, or for the same GIs 1710 between the integrated type devices.

Furthermore, for a computer system 3304 or a storage device 3305 in which a plurality of integrated type devices 3301 are included, it would be possible to disperse the vacant capacity, the I/O load, the CPU usage ratio, or the SNF I/F load.

It should be understood that, in the first embodiment as well, by managing the vacant capacity for each RAID group, the I/O load for each RAID group, the CPU usage ratio for each CPU, and the SNF I/F load for each SNF I/F, it is possible to disperse the vacant capacity or the load for a priority item within a single storage device.

While several embodiments of the present invention have been explained above, these are only given by way of example for explanation of the present invention; the scope of the present invention is not limited to only these embodiments. The present invention could also be implemented in various other ways.

REFERENCE SIGNS LIST

101: management computer, 102: computer, 103: storage device, 1701: virtual machine (VM), 1702: guest OS, 1705: patch, 1708: snapshot, 1709: storage pool, 1710: golden image.

The invention claimed is:

1. A computer system, comprising:
   a first computer that executes a plurality of virtual machines;
   a storage device coupled to said first computer, including a storage medium; and
   a second computer, coupled to said first computer and to said storage device, that applies a patch to a virtual machine for an OS (operating system) operating upon said virtual machine;
   wherein said storage device comprises:
   a master logic unit, that is a storage region storing data at some time instant for said OS operating upon said virtual machine;
   a storage pool, that is a storage region storing the patch applied to said OS upon said virtual machine after said certain time instant;
   and a snapshot logic unit that stores data, that is data of said OS upon said virtual machine, and that is supplied from a snapshot acquired from said master logic unit, and from the patch stored in said storage pool;
   wherein said second computer holds management information, and said management information specifies a correspondence relationship between an identifiers of said virtual machine and an identifier of the patch applied to the OS of said virtual machine, and moreover specifies whether or not said patch applied to the OS of said virtual machine is stored in said storage pool;
   and said second computer:
   selects said master logic unit to which is applied a combination of patches that are made up from a combination of patches applied to the OS of a target virtual machine, that is one said virtual machine among said plurality of virtual machines, as a target master logic unit that is to be a source of acquisition of a snapshot of the snapshot logic unit that corresponds to said target virtual machine;
   refers to said management information; and
   performs duplication elimination in which a patch, among the patches applied to said target virtual machine, that is stored in said target master logic unit, and that moreover is stored in said storage pool, is deleted from said storage pool.

2. A computer system according to claim 1, wherein said second computer:
   holds patch combination information that specifies a combination of patches applied to said virtual machine, an identifier of said virtual machine to which said combination of patches is applied, and an identifier of said master logic unit to which said combination of patches is applied; and performs said duplication elimination on the basis of said patch combination information.

3. A computer system according to claim 2, wherein said second computer:
refers to said patch combination information, and, if a combination of patches applied to said target virtual machine, and the identifier of said virtual machine to which said combination of patches is applied, and the identifier of said master logic unit to which said combination of patches is applied, all exist, selects said patch combination as the target combination; and
refers to said management information, and selects, as said target master logic unit, said master logic unit to which said target combination is applied.

4. A computer system according to claim 3, wherein said second computer holds a threshold value, and compares the value that is deleted by executing said duplication elimination with said threshold value and performs said duplication elimination if said value that is deleted exceeds said threshold value.

5. A computer system according to claim 4, wherein said threshold value is the value of capacity for storage of data, and said second computer refers to said management information, and obtains said value that is deleted by adding together the capacities of those patches, among the patches applied to said target virtual machine, that are stored in said storage pool.

6. A computer system according to claim 2, wherein said second computer refers to said patch combination information, and, if the combination of patches applied to said target virtual machine and the identifier of said virtual machine to which said combination of patches is applied both exist, but the identifier of said master logic unit to which said combination of patches is applied does not exist: selects said patch combination as a target combination; selects a first master logic unit from said master logic units to which combinations of patches that are created from patches that make up said target combination are applied; and selects, as said target master logic unit, said first master logic unit or a second master logic unit that is a copy of said first master logic unit.

7. A computer system according to claim 6, wherein said second computer, when selecting from among said first master logic unit or said second master logic unit as said target master logic unit corresponding to said target virtual machine, selects that said master logic unit whose capacity that is deleted is the largest, as said target master logic unit.

8. A computer system according to claim 7, wherein said second computer:
if said first master logic unit is taken as said target master logic unit, takes the total capacity of patches that are patches, among those patches that are applied to said target virtual machine, that are applied to said first master logic unit, and that moreover are stored in said storage pool, as said capacity that is deleted; and
if said second master logic unit is taken as said target master logic unit, takes the patches of, among those patches that are applied to said target virtual machine, the total capacity of the patches that are stored in said storage pool, and the capacity of said second master logic unit, as said capacity that can be deleted.

9. A computer system according to claim 8, wherein said second computer holds a capacity threshold value, compares together said capacity that is deleted and said capacity threshold value, and performs said duplication elimination if said capacity that is deleted exceeds said capacity threshold value.

10. A computer system according to claim 6, wherein said first master logic unit is that said master logic unit, among said master logic units to which are applied combinations of patches that are created from the patches that make up said target combination, for which the total capacity of said applied patches is the largest.

11. A computer system according to claim 2, wherein said second computer, when deleting said master logic unit that is not a said master unit that is the source of acquisition of a snapshot of any one of said snapshot logic units, performs duplication elimination upon said master logic unit for which said master logic unit of a patch combination in which the minimum number of remaining combinations of patches applied to said virtual machine exists.

12. A control method for a computer system that comprises:
a first computer that executes a plurality of virtual machines;
a storage device coupled to said first computer, including a storage medium; and
a second computer, coupled to said first computer and to said storage device, that applies a patch to a virtual machine for an OS (operating system) operating upon said virtual machine; comprising:
storing data in a master logic unit at some time instant for an OS operating upon said virtual machine;
storing the patch applied to said OS upon said virtual machine after said certain time instant in a storage pool;
storing data, that is data of said OS upon said virtual machine, and that is supplied from a snapshot acquired from said master logic unit, and from the patch stored in said storage pool, in a snapshot logic unit; referring to management information that specifies whether or not said patch applied to the OSs of some virtual target machine among said virtual machines are stored in said storage pool, and patch combination information that specifies combinations of patches applied to said virtual machines, identifiers of said virtual machines to which said combinations of patches are applied, and identifiers of said master logic units to which said combinations of patches are applied;
selecting, as a target master logic unit which is the source of acquisition of a snapshot of a snapshot logic unit corresponding to said target virtual machine, said master logic unit to which a combination of patches that is made up from combinations of patches applied to said target virtual machine is applied; and
performing duplication elimination upon, and deleting from said storage pool, a patch, among the patches applied to said target virtual machine, that is stored in said target master logic unit, and that moreover is stored in said storage pool.

13. A control method for a computer system according to claim 12, further comprising:
referring to said patch combination information, and, if a combination of patches applied to said target virtual machine, and the identifier of said virtual machine to which said combination of patches is applied, and the identifier of said master logic unit to which said combination of patches is applied, all exist, selecting said patch combination as the target combination; and
referring to said management information, and selecting, as said target master logic unit, said master unit to which said target combination is applied.

14. A control method for a computer system according to claim 12, further comprising referring to said patch combination information, and, if the combination of patches applied to said target virtual machine and the identifier of said virtual machine to which said combination of patches is applied exist, but the identifier of said master logic unit to which said combination of patches is applied does not exist: selecting said patch combination as a target combination; selecting, as said first master logic unit, from among said master logic units to which a combination of patches that can be created from patches that make up said target combination is applied, that master logic unit for which the total capacity of said applied patches is the largest; and selecting, as said target master logic unit, among the second master logic units that are copies of said first master logic unit, that master logic unit whose capacity that can be eliminated by duplication elimination is the largest.

\* \* \* \* \*